United States Patent
Harada et al.

(10) Patent No.: US 7,853,207 B2
(45) Date of Patent: Dec. 14, 2010

(54) ELECTRONIC DEVICE, PRIORITY CONNECTION METHOD AND PRIORITY CONNECTION PROGRAM

(75) Inventors: Noriyuki Harada, Kawasaki (JP); Hiroshi Kanno, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 365 days.

(21) Appl. No.: 11/343,291

(22) Filed: Jan. 31, 2006

(65) Prior Publication Data

US 2006/0229014 A1 Oct. 12, 2006

(30) Foreign Application Priority Data

Apr. 12, 2005 (JP) .............................. 2005-114950
Nov. 8, 2005 (JP) .............................. 2005-323867

(51) Int. Cl.
*H04B 5/00* (2006.01)
(52) U.S. Cl. ..................................... 455/41.1; 455/418
(58) Field of Classification Search ........................ None
See application file for complete search history.

(56) References Cited

U.S. PATENT DOCUMENTS

| | | | |
|---|---|---|---|
| 6,957,045 B2 * | 10/2005 | Haller et al. ............... | 455/41.1 |
| 7,231,179 B2 | 6/2007 | Karusawa | |
| 2003/0220077 A1 | 11/2003 | Hosokawa | |
| 2004/0148404 A1 | 7/2004 | Muroya et al. | |
| 2005/0032502 A1 * | 2/2005 | Tokudome .................. | 455/403 |
| 2005/0032535 A1 * | 2/2005 | Shitama et al. ............. | 455/512 |

FOREIGN PATENT DOCUMENTS

| | | |
|---|---|---|
| JP | 63-9239 A | 1/1988 |
| JP | 2003-22490 | 1/2003 |
| JP | 2003-22490 A | 1/2003 |
| JP | 2003-218996 A | 7/2003 |
| JP | 2003-348100 | 12/2003 |
| JP | 2004-112243 A | 4/2004 |
| JP | 2004-112257 A | 4/2004 |
| JP | 2005-33672 A | 2/2005 |
| KR | 2003-0037995 | 5/2003 |
| WO | WO-2002/87165 | 10/2002 |

OTHER PUBLICATIONS

Office Action issued in corresponding Korean Patent Application No. 10-2006-0008232, mailed on Feb. 22, 2008.
"Japanese Office Action", mailed by JP Patent Office and corresponding to Japanese application No. 2005-323867 on Aug. 24, 2010, with partial English translation.

* cited by examiner

*Primary Examiner*—Erika A Gary
(74) *Attorney, Agent, or Firm*—Fujitsu Patent Center

(57) ABSTRACT

The present invention is comprised of a communication unit (short-range wireless communication unit 10) for transmitting/receiving a short-range wireless signal to/from one or more devices (devices 61 to 6N) with a short-range wireless communication function, a registration unit (database 18) for adding priorities to the plurality of the devices and registering a prioritization list representing one or more devices sorted by the priorities, and a control unit (processor 8) for dynamically selecting one or more devices based on the prioritization list and controlling connection through the communication unit with the selected one or more devices.

14 Claims, 33 Drawing Sheets

| 1 |
|---|
| SHORT-RANGE WIRELESS COMMUNICATION ADDRESS OF DEVICE 61 |
| 2 |
| SHORT-RANGE WIRELESS COMMUNICATION ADDRESS OF DEVICE 62 |
| 3 |
| SHORT-RANGE WIRELESS COMMUNICATION ADDRESS OF DEVICE 63 |

| 1 |
|---|
| SHORT-RANGE WIRELESS COMMUNICATION ADDRESS OF DEVICE 61 |
| 2 |
| SHORT-RANGE WIRELESS COMMUNICATION ADDRESS OF DEVICE 62 SHORT-RANGE WIRELESS COMMUNICATION ADDRESS OF DEVICE 63 |

WITHIN RADIUS OF 10m FROM POSITION COORDINATES OF HOME

1

SHORT-RANGE WIRELESS COMMUNICATION ADDRESS OF DEVICE 61

2

SHORT-RANGE WIRELESS COMMUNICATION ADDRESS OF DEVICE 62

3

SHORT-RANGE WIRELESS COMMUNICATION ADDRESS OF DEVICE 63

II — 2

OTHERS (= EXCEPT WITHIN RADIUS OF 10m FROM POSITION COORDINATES OF HOME)

1

SHORT-RANGE WIRELESS COMMUNICATION ADDRESS OF DEVICE 62

2

SHORT-RANGE WIRELESS COMMUNICATION ADDRESS OF DEVICE 61

SHORT-RANGE WIRELESS COMMUNICATION ADDRESS OF DEVICE 63

SHORT-RANGE WIRELESS COMMUNICATION ADDRESS OF DEVICE 61

2

SHORT-RANGE WIRELESS COMMUNICATION ADDRESS OF DEVICE 62

3

SHORT-RANGE WIRELESS COMMUNICATION ADDRESS OF DEVICE 63

II — 2

OTHERS (= EXCEPT 7:00 to 23:00)

1

SHORT-RANGE WIRELESS COMMUNICATION ADDRESS OF DEVICE 62

2

SHORT-RANGE WIRELESS COMMUNICATION ADDRESS OF DEVICE 61

⋮

ELECTRONIC DEVICE, PRIORITY CONNECTION METHOD AND PRIORITY CONNECTION PROGRAM

CROSS-REFERENCE TO RELATED APPLICATIONS

This application is based upon and claims the benefit of priorities from the prior Japanese Patent Application No. 2005-114950, filed on Apr. 12, 2005, and Application No. 2005-323867, filed on Nov. 8, 2005, the entire contents of which are incorporated herein by reference.

BACKGROUND OF THE INVENTION

1. Field of the Invention

The present invention relates generally to inter-device connection between an electronic device such as a cellular phone with a short-range wireless communication function and another device, and more particularly, to a dynamic priority connection method of an electronic device used for selecting and connecting a connection device with the use of dynamic information representing movement of a device or a user carrying the device, etc., for example, a distance from a connection device, a position thereof and a time, or a received signal level from a base station of a cellular phone, a remaining battery power amount of the cellular phone, a phone call status, etc. in the case that the connection device is a cellular phone, as prioritizing information.

2. Description of the Related Art

As a short-range wireless communication function, for example, device-to-device connection is performed with radio signals in conformity with the Bluetooth communication standard. Wireless connection between devices by such a short-range wireless communication function is utilized for information utilization in data transmission from a cellular phone to a personal computer (PC) or for improving convenience of a device by complementing a function not possessed by one device with another device, such as the case of a cellular phone and a headset. However, if a multiplicity of devices having such a short-range wireless communication function is located around a user, individual setting must be performed for selecting a connection destination of those devices.

This type of technology exists as a technology for forming wireless network with an emergency notification apparatus equipped with a Bluetooth module and a plurality of cellular phones being able to communicate with this emergency notification apparatus in the Bluetooth as well as for selecting a cellular phone in the order of priority from cellular phones participating to the wireless network to attempt to notify the cellular phone (e.g., Japanese Patent Application Laid-Open Publication No. 2003-22490) and a technology for limiting a destination as a device equipped with a short-range wireless communication function matching to a search condition and for transmitting data to the destination (e.g., Japanese Patent Application Laid-Open Publication No. 2003-348100).

By the way, the technology described in Japanese Patent Application Laid-Open Publication No. 2003-22490 (paragraph Nos. 0008, 0018 and 0024, FIG. 1, etc.) merely attempts connection with a nearby cellular phone participating to the wireless network, and the technology described in Japanese Patent Application Laid-Open Publication No.2003-348100 (paragraph Nos. 0025 and 0038, FIG. 1, FIG. 2, etc.) merely searches a destination matching to a search condition set in advance. Either technology does not select a connection destination device from a plurality of devices based on dynamic information such as movement of a device, a reception signal level representing a usage status, a position, a time, etc., has a problem of selecting a connection destination from various devices and does not solve the problem.

In an electronic device with a short-range wireless communication function, for example, a cellular phone, if a user cannot hold or operate the cellular phone, it is inconvenient that a phone call, a check of an incoming call, etc. may not be performed.

With regard to a technology enabling an emergency notification through the mediation of a cellular phone (Japanese Patent Application Laid-Open Publication No. 2003-22490), in a configuration attempting connection in the order of connection to the network from a cellular phone connected first, it is inconvenient that a notification is discontinued or cannot be performed if a received signal level of the cellular phone is low, if remaining battery power amount is low or if the cellular phone is busy.

SUMMARY OF THE INVENTION

Thus, the present invention relates to wireless connection of a plurality of devices with a short-range wireless communication function and achieves improvement of availability of a function possessed by each device by prioritizing connection destination devices to select a connection destination.

For example, the present invention relates to wireless connection of a plurality of devices with a short-range wireless communication function and improves availability of a device by referring to dynamic information as a selection factor, such as a received signal level of the short-range wireless communication function between devices, a position of a device and a time, or a received signal level from a base station of a cellular phone, a remaining battery power amount of the cellular phone, a phone call status, etc. in the case that the connection destination device is a cellular phone, for prioritization which is a selection factor of a connection destination device.

As a specific example, the present invention relates to an emergency transmission of an electronic device such as a cellular phone and contributes to the improvement of the credibility of the emergency transmission by selecting an optimum device from surrounding communication devices to utilize the communication function thereof.

Aspects of the present invention configured to solve above problems are as follows.

A first aspect of the present invention provides an electronic device with a short-range wireless communication function, comprising a communication unit transmitting/receiving a short-range wireless signal to/from one or more devices with a short-range wireless communication function; a registration unit imparting priorities to the plurality of the devices and registering a prioritization list representative of one or more devices sorted by the priorities; and a control unit dynamically selecting one or more devices based on the prioritization list and controlling connection through the communication unit with the selected one or more devices.

According to such a configuration, the electronic device and other one or more devices can be connected with the short-range wireless communication function and the connection is performed through the communication unit in the electronic device. In the electronic device, priorities are added to the plurality of devices which are connection destinations, and the one or more devices sorted by the priorities are registered into the registration unit as the prioritization list. The one or more devices are dynamically selected based on the prioritization list in the registration unit and the electronic device can be connected to the selected one or more devices through the communication unit. The electronic device can give and receive or operate information through other devices.

In the electronic device of the first aspect, as an example, it is configured that the control unit selects a connection destination device from the devices registered into the registration unit with a received signal level of a short-range wireless signal (e.g., an intensity of RSSI (Receive Signal Strength Indication) or lowness of a bit error rate) which can be obtained by connecting the device and that the selected one or more devices are automatically connected through the communication unit. As an example, if the device registered into the registration unit is a cellular phone, it is configured that a communication destination cellular phone is selected by a received signal level from a base station of the cellular phone which can be obtained by connecting and communicating the cellular phone, a remaining battery power amount of the cellular phone and a phone call status and that the selected one or more cellular phones are automatically connected through the communication unit. According to such a configuration, since the connection destination device is selected by the received signal level of the short-range wireless signal, etc., the credibility of the connection is enhanced and this is useful for giving and receiving information.

In the electronic device, if the device registered into the registration unit is a cellular phone, it may be configured that the control unit selects one or more cellular phones as connection destinations from the electronic device depending on a received signal level obtained from communication connection with the base station and that the cellular phones are automatically connected through the communication unit.

In the electronic device, if the device registered into the registration unit is a cellular phone, it may be configured that the control unit selects one or more cellular phones as connection destinations from the cellular phones depending on a remaining battery power amount and that the cellular phones are automatically connected through the communication unit.

In the electronic device, if the device registered into the registration unit is a cellular phone, it may be configured that the control unit selects one or more cellular phones as connection destinations from the cellular phones depending on communication status and that the cellular phones are automatically connected through the communication unit.

In the electronic device, it may be configured that the number of the devices connected concurrently is registered into the registration unit and that the devices of the number corresponding to the number of devices are concurrently connected. According to such a configuration, since one or more connection destinations are defined by the priority, connectivity can be enhanced for devices with high availability and convenience for a user is improved.

In the electronic device, along with one or more pieces of position information which are movement destinations of the electronic device, one or more devices with priorities added for each piece of the position information are registered into the prioritization list, and by selecting one or more devices retrieved from the prioritization list, the selected one or more devices can be automatically connected through the communication unit. According to such a configuration, the electronic device moving along with a user and the connection destinations can be dynamically controlled with the position information, and connection can be achieved with the device having the highest availability.

In the electronic device, along with one or more pieces of time information, one or more devices with priorities added for each piece of the time information are registered into the prioritization list, and by selecting one or more devices retrieved from the prioritization list, the selected one or more devices can be automatically connected through the communication unit. According to such a configuration, the electronic device and the connection destinations can be dynamically controlled with the time information, and connection can be achieved with the device having the highest availability during that time period.

In the first aspect, the electronic device or the device may be an information terminal device such as a cellular phone and a personal computer, a household electric device such as a television set, a moving device such as an automobile, a watch and a navigation apparatus. In other words, the electronic device can be any devices equipped with the short-range wireless communication function and can connect with a device having the highest availability.

A second aspect of the present invention provides a priority connection method connecting an electronic device with a short-range wireless communication function and another device, comprising the operations of transmitting/receiving a short-range wireless signal to/from one or more devices with a short-range wireless communication function; imparting priorities to the plurality of the devices and registering a prioritization list representative of one or more devices sorted by the priorities into a registration unit; and dynamically selecting one or more devices based on the prioritization list and controlling connection with the selected one or more devices in short-range wireless communication. According to such a connection method, connection can be performed with the one or more devices registered into the prioritization list.

The priority connection method of the second aspect may be configured to include the operations of selecting a connection destination device from the devices registered into the registration unit with a received signal level of a short-range wireless signal which can be obtained by connecting the device and for automatically connecting the selected one or more devices in the short-range wireless communication. The priority connection method may be configured to include the operation of registering the number of the devices connected concurrently into the registration unit and the operation of concurrently connecting the devices of the number corresponding to the number of the devices.

The priority connection method may be configured to include the operation of registering one or more devices with priorities added for each piece of position information into the prioritization list along with one or more pieces of the position information which are movement destinations of the electronic device and/or the operation of registering one or more devices with priorities added for each piece of time information along with one or more pieces of the time information, and the operation of dynamically selecting one or more devices based on the prioritization list to perform connection control of the selected one or more devices in the short-range wireless communication.

A third aspect of the present invention provides a priority connection program executed by a computer to connect an electronic device with a short-range wireless communication function with another device, the program comprising the steps of transmitting/receiving a short-range wireless signal to/from one or more devices with a short-range wireless communication function; imparting priorities to the plurality of the devices and registering a prioritization list representative of one or more devices sorted by the priorities into a registration unit; and dynamically selecting one or more devices based on the prioritization list and controlling connection with the selected one or more devices in short-range wireless communication. According to such a connection program, connection with the one or more devices registered in the prioritization list is realized by computer processing.

The priority connection program of the third aspect may be configured to comprise the step of selecting a connection destination device from devices registered in the registration unit using a received signal level of a short-range wireless signal obtained when connected and automatically connecting with the selected one or more devices in short-range wireless communication. The priority connection program may comprise the steps of registering the number of devices connected concurrently into the registration unit; and concurrently connecting with corresponding number of devices to the number of the devices. The priority connection program may comprise the steps of registering into the prioritization list one or more pieces of position information which are movement destinations of the electronic device as well as one or more devices with priorities imparted for each piece of the position information and/or registering one or more pieces of time information as well as one or more devices with priorities imparted for each piece of the time information; and dynamically selecting one or more devices based on the prioritization list and controlling connection with the selected one or more devices in short-range wireless communication.

According to the present invention, the following advantages can be obtained.

(1) For a certain device and another plurality of devices equipped with a short-range wireless communication function, automatic connection can be performed between the devices registered in accordance with priorities set in advance, and the device with the highest availability for a user can be connected to enhance convenience of each device.

(2) For a certain device and another plurality of devices equipped with a short-range wireless communication function, automatic connection can be performed between the devices based on not only the priorities set in advance but also dynamic information such as a received signal level and a position or a received signal level from a base station of a cellular phone, a remaining battery power amount of the cellular phone, a phone call status, etc. in the case that the connection destination device is a cellular phone; the device with higher availability for a user can be connected depending on position of user and form of action; the short-range wireless communication function of the device can be utilized; and convenience of each device can be enhanced.

BRIEF DESCRIPTION OF THE DRAWINGS

The above and other objects, aspects, features and advantages of the present invention will become more apparent from the following detailed description when taken in conjunction with the accompanying drawings, in which:

FIGS. 3A and 3B are diagrams showing a configuration example of a prioritization list of a database;

FIGS. 4A and 4B are diagrams showing a registration example of the number of connection devices of the database;

FIG. 5 is a diagram showing a configuration example of a prioritization list for each position of the database;

FIG. 6 is a diagram showing a configuration example of a prioritization list for each time period of the database;

DETAILED DESCRIPTION OF THE PREFERRED EMBODIMENTS

First Embodiment

Figure 1:
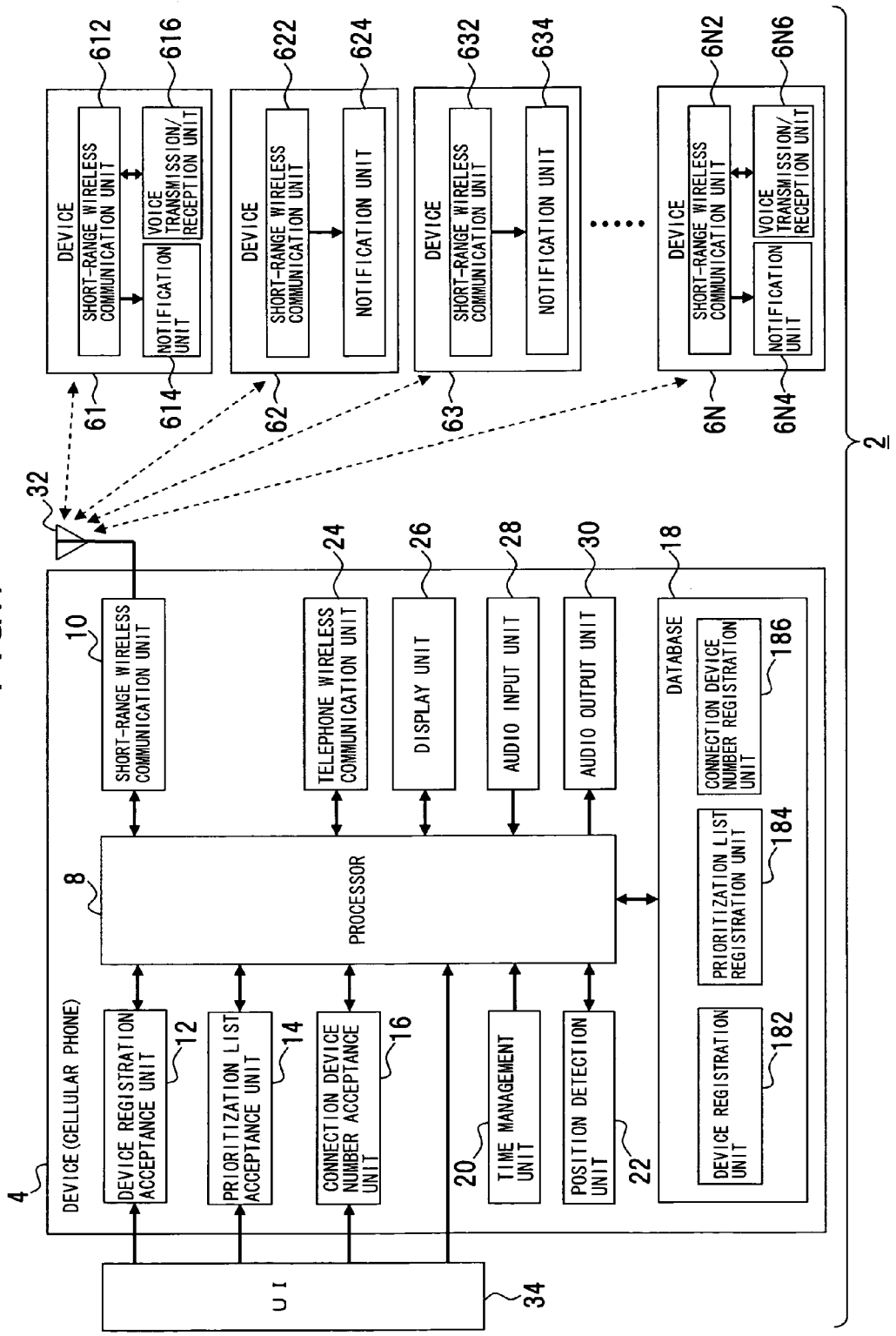
FIG. 1 is a block diagram showing a dynamic priority connection system according to a first embodiment.

A first embodiment of the present invention is described with reference to FIG. 1. FIG. 1 is a block diagram showing an embodiment of an inter-device priority connection apparatus.

In this embodiment, as an example of an electronic device and a priority connection apparatus using an electronic device of the present invention, a dynamic priority connection system 2 is constructed. In the dynamic priority connection system 2, as an example of an electronic device with a short-range wireless communication function such as the Bluetooth, a cellular phone 4 is installed and, as devices with the same short-range wireless communication function as the cellular phone 4, devices 61, 62, 63 . . . 6N are installed, for example. In other words, a connection destination of the cellular phone 4 in the short-range wireless communication is one or more devices selected from a plurality of the devices 61, 62, 63 ... 6N. Each device 61, 62, 63 ... 6N is a device selected from, for example, an information terminal device such as a cellular phone and a personal computer, a household electric device such as a television set, a moving device such as an automobile, a watch and a GPS (Global Positioning System) apparatus or GPS equipped device, and in this case, any devices may be applicable as long as communication and connection can be achieved with the cellular phone 4 with the use of the short-range wireless communication function such as the Bluetooth. The devices 61, 62, 63 ... 6N are devices connectable to the cellular phone 4 carried by a user, and the connection destination of the cellular phone 4 is one or more devices selected from the devices 61, 62, 63 ... 6N in accordance with dynamic information such as prioritization, received signal levels, staying positions such as a home or an office, or a time of one or more devices selected from the devices 61, 62, 63 ... 6N and is not fixed to certain devices. In that sense, the connection destination of the cellular phone 4 is dynamic rather than static.

The cellular phone 4 is comprised of a processor 8, a short-range wireless communication unit 10, a device registration acceptance unit 12, a prioritization list acceptance unit 14, a connection device number acceptance unit 16, a database 18, a time management unit 20, a position detection unit 22, a telephone wireless communication unit 24, a display unit 26, an audio input unit 28, an audio output unit 30, etc.

The processor 8 is a control unit constituted by a computer comprising a CPU (Central Processing Unit), a ROM (Read-Only Memory), a RAM (Random-Access Memory), etc., and executes processing such as after-mentioned dynamic priority connection control, phone call control, display control, registration processing and retrieval processing of connection destination information, short-range wireless communication control, positioning control, timing control and display control of various types of control information.

The short-range wireless communication unit 10 is connected to the connection destination devices 61, 62, 63 ... 6N in wireless communication by using, for example, an electromagnetic wave in conformity with the Bluetooth communication standard or a transmission medium in conformity with other communication standards as a radio signal received and transmitted through an antenna 32. The cellular phone 4 and the connection destination devices 61, 62, 63 ... 6N are connected using radio signals to give and receive data and audio. In this embodiment, a radio signal is transmitted from the short-range wireless communication unit 10 at each predetermined time; searching is performed by communication with the connection destination device at each predetermined time with the received signal; and information representing the search result is captured by the processor 8.

The device registration acceptance unit 12 accepts a registration instruction for, for example, device addresses, etc. of the devices 61, 62, 63 ... 6N as connection destination devices added from a user interface (UI) 34. The UI 34 is constituted by a keyboard or a cursor and icons displayed on the display unit 26. The prioritization list acceptance unit 14 accepts a prioritization list dependent on information such as position, time, etc. and a prioritization list not dependent on information such as position, time, etc., and the connection device number acceptance unit 16 accepts the number of the connection devices. Operation information is input from the UI 34 to the processor 8.

The database 18 stores communication destination information, place names and map information as position information, etc. and stores information corresponding to a device registration unit 182, a prioritization list registration unit 184, a connection device number registration unit 186, etc. which are set within the database 18. The device registration unit 182 stores, for example, device addresses based on the Bluetooth standard as the information representing the connection destination devices 61, 62, 63 ... 6N; the prioritization list registration unit 184 stores the device addresses with priorities added, as a prioritization list; and the connection device number registration unit 186 stores the number N (=1 or n, wherein n=2, 3 ... ) of the connection devices connected concurrently.

In the time management unit 20, a timer, etc. is installed to manage clock times as the selection information of the connection destination. This time information is used as the temporal connection information of the connection destination for a behavior pattern or movement area of a user.

In the position detection unit 22, a global positioning system (GPS), navigation system, etc. is used for detecting position information, such as place names and map information, as the movement position of the cellular phone 4. This position information is captured by the processor 8 and stored into the database 18.

The telephone wireless communication unit 24 is connected to a regular telephone line and used for a phone call with a destination telephone through a telephone exchange station. In other words, audio applied to the audio input unit 28 are transmitted through the processor 8 from the telephone wireless communication unit 24 and the received audio of the telephone wireless communication unit 24 is output from the audio output unit 30.

The display unit 26 displays various types of information such as the connection destination information and a reception notification. On the display unit 26, a cursor and icons are displayed and, through operation information applied from the UI 34, the cursor is moved or information is selected with the icon.

In this embodiment, the device 61 is comprised of a short-range wireless communication unit 612 and a notification unit 614; the device 62 is comprised of a short-range wireless communication unit 622 and a notification unit 624; the device 63 is comprised of a short-range wireless communication unit 632 and a notification unit 634; ... ; and the device 6N is comprised of a short-range wireless communication unit 6N2 and a notification unit 6N4. The notification units 614, 624, 634 ... 6N4 are constituted by display units and/or audio notification units and display information such as the reception notification or the destination. A voice transmission/reception unit 616 is installed in the device 61 to enable a voice telephone call, etc. with the cellular phone 4 through the short-range wireless communication unit 612. Similarly, a voice transmission/reception unit 6N6 is installed in the device 6N to enable a voice telephone call, etc. with the cellular phone 4 through the short-range wireless communication unit 6N2.

According to such a dynamic priority connection system 2, based on an instruction of the device registration acceptance unit 12, by transmitting radio signals from the short-range wireless communication unit 10 to the devices 61 to 6N, the presence thereof is identified with response signals, i.e., received signals from the device 61 to 6N in the short-range wireless communication, and the device addresses representing one or more devices of the responding devices 61 to 6N can be registered into the device registration unit 182 of the database 18. By synchronizing the communication with the registered devices, the received signal levels from the device 61 to 6N are monitored by the short-range wireless communication unit 10. If the registered device is a cellular phone, by synchronizing the communication with the cellular phone and performing communication and by having the cellular phone notify the electronic device of a received signal level from a base station of the cellular phone, a remaining battery power amount of the cellular phone and a phone call status, the received signal level, the remaining battery power amount and the phone call status of the registered cellular phone can be managed.

Based on an instruction of the prioritization list acceptance unit 14, a prioritization list can be registered into the prioritization list registration unit 184 of the database 18. With regard to this prioritization list registration:

(a) registration of an arbitrary prioritization list;
(b) registration of a prioritization list for each position; and
(c) registration of a prioritization list for each time period exist and this registration is arbitrary.

In the registration of an arbitrary prioritization list (a), a connection order is registered for one or more devices selected from the desired devices 61 to 6N, which are desired by a user. Prioritization can be performed for registration of high availability devices in the vicinity of the user or cellular phone 4. The registration of a prioritization list for each position (b) corresponds to movement destinations of the user and the cellular phone 4, and by using the position information as parameter information, a connection order is registered for one or more devices selected from the devices 61 to 6N. Prioritization can be performed for registration of high availability devices by dynamically corresponding to the movement position of the user and the cellular phone 4. The registration of a prioritization list for each time period (c) corresponds to each time period of the user and the cellular phone 4, and by using the time information as parameter information, a connection order is registered for one or more devices selected from the devices 61 to 6N. Prioritization can be performed for registration of high availability devices by dynamically corresponding to the form of behavior, etc. of the user and the cellular phone 4.

In addition to the registration of such a prioritization list, based on an instruction of the connection device number acceptance unit 16, the number of devices to be connected concurrently can be registered for one or more devices selected from the devices 61 to 6N. When the prioritization is performed, recognizability and convenience are improved by concurrently connecting a plurality of the devices without limiting the selected device to a single device.

As an example of connection to one or more devices selected from the devices 61 to 6N registered into the prioritization list, the connection can be achieved with the device with the highest received signal level by monitoring the received signal level of the short-range wireless communication. As an example, if the registered devices are cellular phones, by having the cellular phones notify of a received signal level from a base station of the cellular phone, a remaining battery power amount of the cellular phone and a phone call status, the cellular phones having the remaining battery power amount and not in a phone-calling status are selected and the connection can be achieved with a cellular phone among those cellular phones, which has the highest received signal level from the base station. With such a connection form, the credibility of the connection can be improved and the intelligibility of the phone call can be enhanced.

With regard to the telephone or e-mail communication, in addition to the reception notification and the display of the e-mail from the cellular phone 4 to the notification units 614, 624 . . . 6N4 of the device 61 to 6N, voice transmission/reception can be performed through the mediation of the short-range wireless communication by the voice transmission/reception units 616, 6N6. With regard to the communication and control from the devices 61 to 6N in priority connection with the cellular phone 4, the control can be performed for fixed-form text mail transmission from the devices 61 to 6N and setting and cancellation of various modes such as a silent mode of the cellular phone 4.

Figure 2:
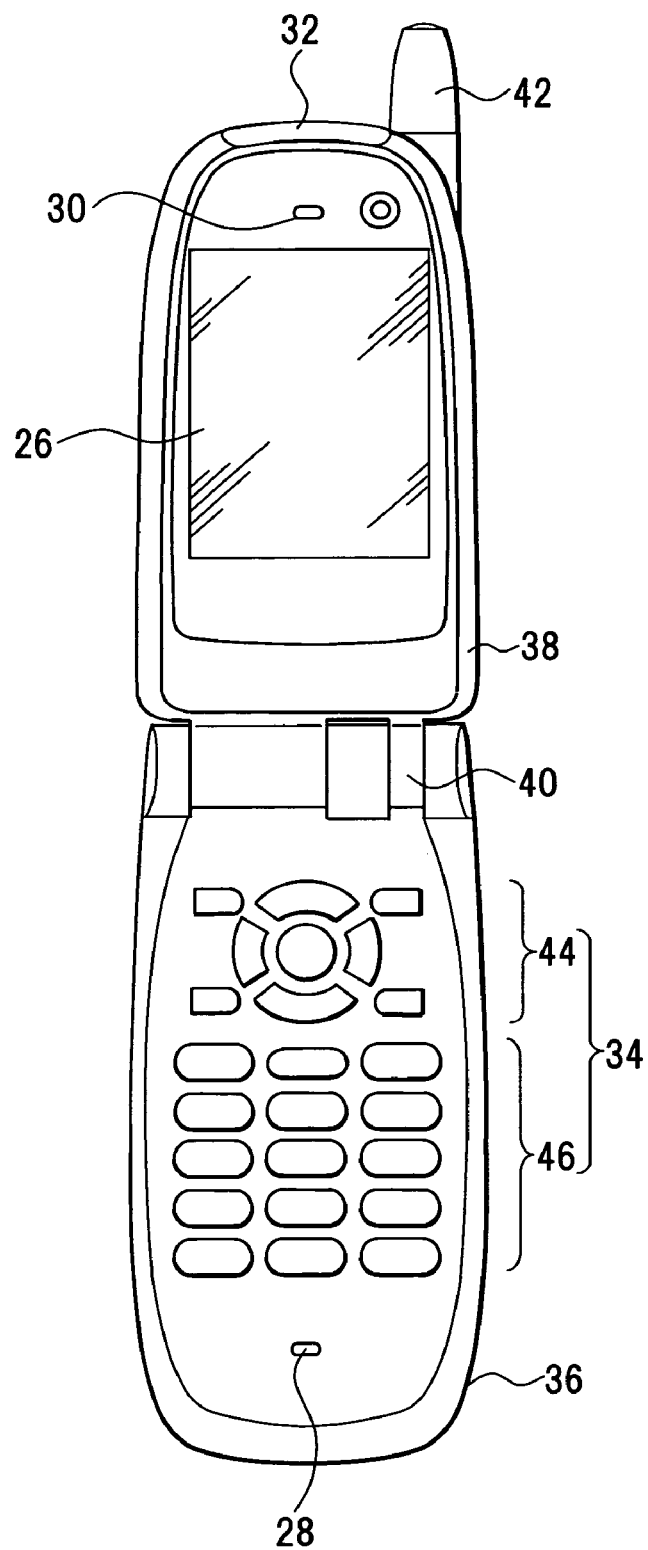
FIG. 2 is a diagram showing a configuration example of a cellular phone.

A configuration example of the cellular phone 4 is described with reference to FIG. 2. FIG. 2 is a diagram showing a configuration example of the cellular phone 4 described above. In FIG. 2, the same symbols are added to the portions same as or corresponding to the cellular phone 4 shown in FIG. 1.

As shown in FIG. 2, the cellular phone 4 is comprised of first and second chassis units 36, 38 and is configured that these chassis units 36, 38 can be opened and closed with a hinge unit 40. The chassis unit 36 is equipped with the processor 8, the short-range wireless communication unit 10, the device registration acceptance unit 12, the prioritization list acceptance unit 14, the connection device number acceptance unit 16, the database 18, etc. as described above, and the chassis unit 38 is equipped with the display unit 26, antennas 32, 42, etc. The antenna 42 is used for transmitting and receiving radio signals of the telephone wireless communication unit 24. In the cellular phone 4 of this embodiment, the above-described UI 34 is constituted by a plurality of keys, and these keys include cursor keys 44 and character keys 46, for example.

Figures 4A, 4B:
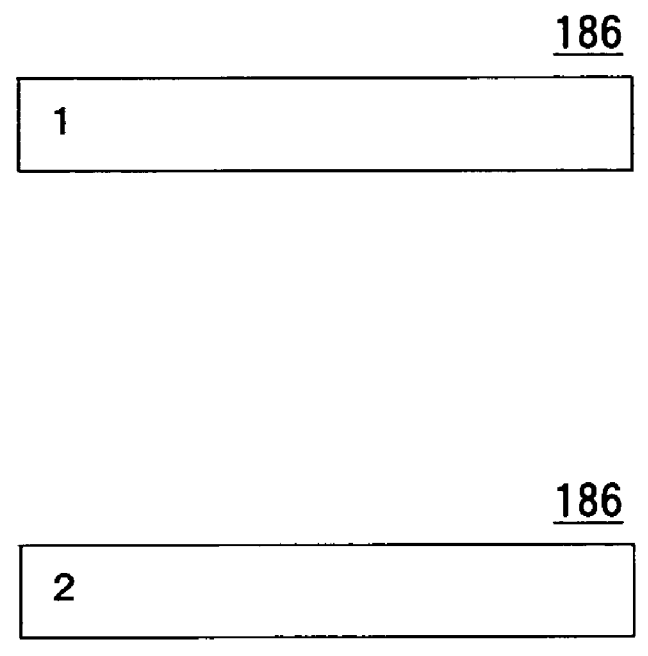

The information stored in the database 18 is described with reference to FIG. 3A, FIG. 3B, FIG. 4A, FIG. 4B, FIG. 5 and FIG. 6. FIG. 3A and FIG. 3B are diagrams showing configuration examples of the prioritization list registered in the prioritization list registration unit 184; FIG. 4A and FIG. 4B are diagrams showing registration example of the number of the connection device registered in the connection device number registration unit 186; FIG. 5 is a diagram showing a configuration example of the prioritization list using position information as a parameter; and FIG. 6 is a diagram showing a configuration example of the prioritization list using time information as a parameter.

With regard to a registration example of the prioritization list, in the registration example shown in FIG. 3A, prioritization information "1", "2" and "3" is set for representing a first to third priorities of-connection destinations; the first priority "1" is set to, for example, the address of the device 61 in the short-range wireless communication; the second priority "2" is set to, for example, the address of the device 62 in the short-range wireless communication; and, the third priority "3" is set to, for example, the address of the device 63 in the short-range wireless communication.

With regard to another registration example of the prioritization list, in the registration example shown in FIG. 3B, prioritization information "1" and "2" is set for representing the first and second priorities; the first priority "1" is set to, for example, the address of the device 61 in the short-range wireless communication; and the second priority "2" is set to the addresses of two (2) devices, for example, the devices 62 and 63 in the short-range wireless communication which are set to the same priority.

With regard to a registration example of the number of the connection devices, in the registration example shown in FIG. 4A, "1" is registered as a connection number and the connection number "1" represents that the number of the connection destination devices is one. In the registration example shown in FIG. 4B, "2" is registered as a connection number and the connection number "2" represents that the number of the connection destination devices is two.

With regard to a registration example of the prioritization list using the position information as a parameter, in the registration example shown in FIG. 5, prioritization information "1" and "2" is registered for representing first and second higher-level priorities I and II of the connection destinations; the higher-level priority I is set to a range within a radius of 10 [m] from position coordinates of a home; and the higher-level priority II is set to other positions, for example, a range except within a radius of 10 [m] from position coordinates of a home. Prioritization information "1", "2" and "3" representing lower-level priorities is registered to the higher-level priority I, and prioritization information "1" and "2" representing lower-level priorities is registered to the higher-level priority II. In this example, at "1" of I, the address of the device 61 in the short-range wireless communication is registered, for example; at "2" of I, the address of the device 62 in the short-range wireless communication is registered, for example; and at "3" of I, the address of the device 63 in the short-range wireless communication is registered, for example. At "1" of II, the address of the device 62 in the short-range wireless communication is registered, for example, and at "2" of II, the addresses of the devices 61 and 63 in the short-range wireless communication are registered as the same priority, for example.

With regard to a registration example of the prioritization list using the time information as a parameter, in the registration example shown in FIG. 6, prioritization information "1" and "2" is registered for representing first and second higher-level priorities I and II of the connection destinations; at the higher-level priority I, a time period from 7:00 to 23:00 is registered, for example; and at the higher-level priority II, other time ranges are registered. Prioritization information "1", "2" and "3" representing lower-level priorities is registered to the higher-level priority I, and prioritization information "1" and "2" representing lower-level priorities is registered to the higher-level priority II. In this example, at "1" of I, the address of the device 61 in the short-range wireless communication is registered, for example; at "2" of I, the address of the device 62 in the short-range wireless communication is registered, for example; and at "3" of I, the address of the device 63 in the short-range wireless communication is registered, for example. At "1" of II, the address of the device 62 in the short-range wireless communication is registered, for example, and at "2" of II, the addresses of the device 61 in the short-range wireless communication is registered, for example.

Figure 7:
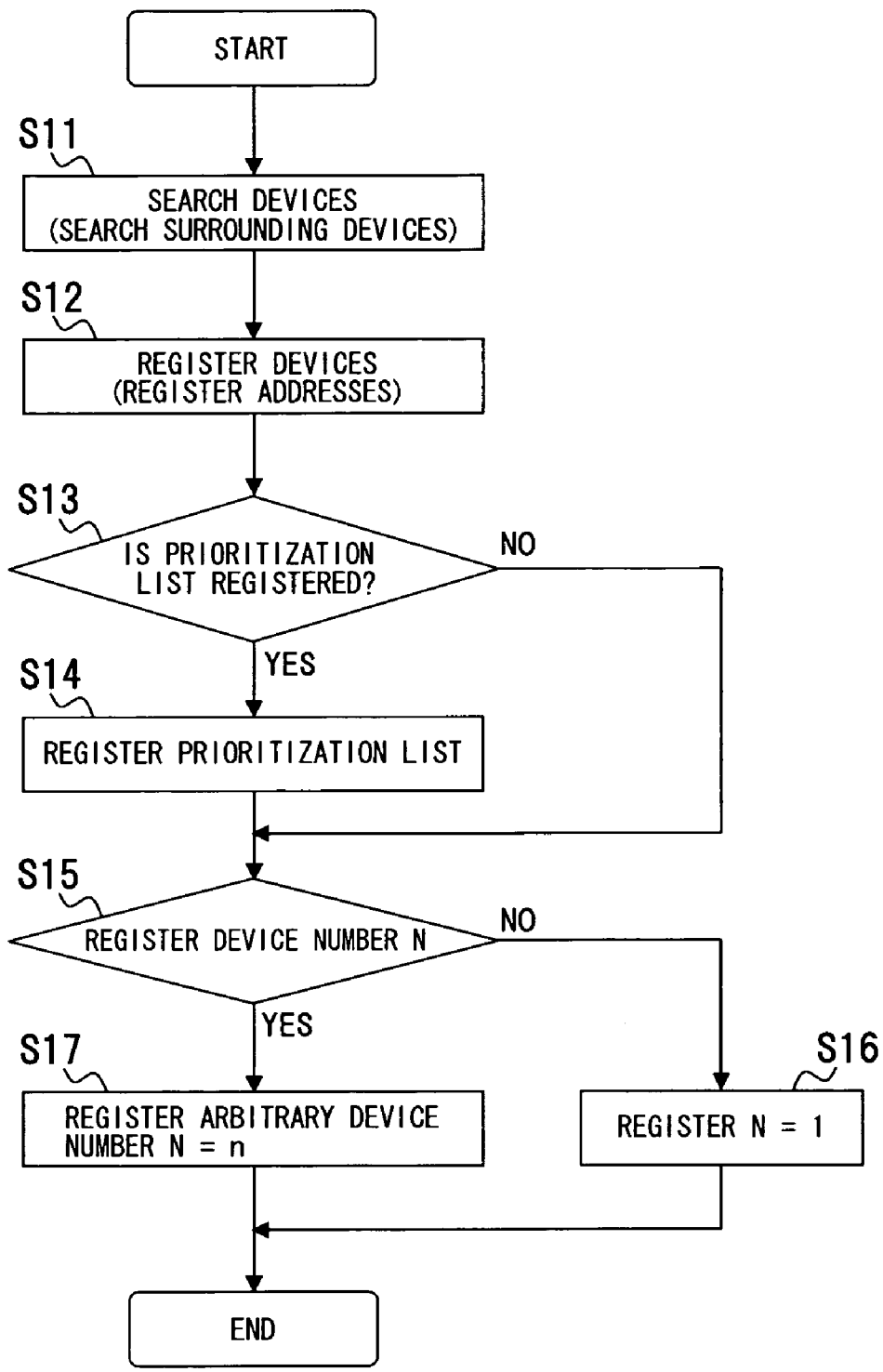
FIG. 7 is a flowchart showing first device registration processing.

A first registration method of the cellular phone 4 (FIG. 1) and the device is described with reference to FIG. 7. FIG. 7 is a flowchart showing a device registration processing.

In this registration processing, a search of the connection destination devices 61, 62 . . . 6N is performed in advance (step S11), and if a registration target device exists as a result of the search, a device address of the devise is registered (step S12). This device address is, for example, a device address in a short-range wireless communication and is registered into the device registration unit 182 of the database 18.

After this device registration, it is inquired whether a prioritization list not dependent on position or time is registered or not (step S13); if the prioritization list is registered, the registration processing for the prioritization list is performed (step S14); and an inquiry is performed for registration of the number N of the devices connected concurrently (step N15). If the prioritization list is not registered, the procedure proceeds to step S15. If the device number N is not registered, N=1 is forcibly registered (step S16), and if the device number N is registered, the desired device number N (=n) is registered (step S17).

With regard to this registration processing, describing the case that the devices 61, 62, 63 (FIG. 1) are registered into the cellular phone 4 in detail, the device registration acceptance unit 12 of the cellular phone 4 accepts a device registration instruction, and the instruction is applied from the device registration acceptance unit 12 to the processor 8 and is delivered through the processor 8 to the short-range wireless communication unit 10. The short-range wireless communication unit 10 transmits radio signals to search the surrounding devices 61, 62, 63 . . . 6N. In this search, the presence is identified with response signals from the devices 61 to 6N. As a result, for example, if the devices 61, 62, 63 are searched as the connection destination devices, the device address of each device 61, 62, 63 in the short-range wireless communication is notified from the short-range wireless communication unit 10 to the processor 8. The device address representing each devices 61, 62, 63 is registered into the device registration unit 182 of the database 18 by the processor 8 which has received the notification.

In the arbitrary registration (step S14), the prioritization list acceptance unit 14 is requested to register the prioritization list not dependent on position or time; the prioritization list acceptance unit 14 notifies the processor 8 of the request; and the processor 8 reads the device addresses from the device registration unit 182 of the database 18 and notifies the prioritization list acceptance unit 14 of the device addresses. In this case, the display unit 26 displays the device addresses. The device addresses are prioritized from the UI 34 through the prioritization list acceptance unit 14. In this case, the prioritization is performed as shown in table 1, for example.

TABLE 1

Arbitrary prioritization list

| Priority | registered device |
| --- | --- |
| First priority | device address of device 61 |
| second priority | device address of device 62 |
| Third priority | device address of device 63 |

The prioritization may be performed as shown in table 2, for example.

TABLE 2

Arbitrary prioritization list

| Priority | registered device |
| --- | --- |
| First priority | device address of device 61 |
| second priority | device address of device 62 |
|  | device address of device 63 |

Such a prioritization list is notified through the prioritization list acceptance unit 14 to the processor 8 and is stored into the prioritization list registration unit 184 of the database 18 by the processor 8.

In the registration processing for the device number N (steps S15, S17), the connection destination device number N=n is registered. This registration is notified to the connection device number acceptance unit 16. As the connection device number, N=2 is registered, for example. N=2 is notified through the connection device number acceptance unit 16 to the processor 8 and is registered into the connection device number registration unit 186 of the database 18. If the connection destination device number N is not registered (steps S15, S16), N=1 is forcibly stored as a default value.

Figure 8:
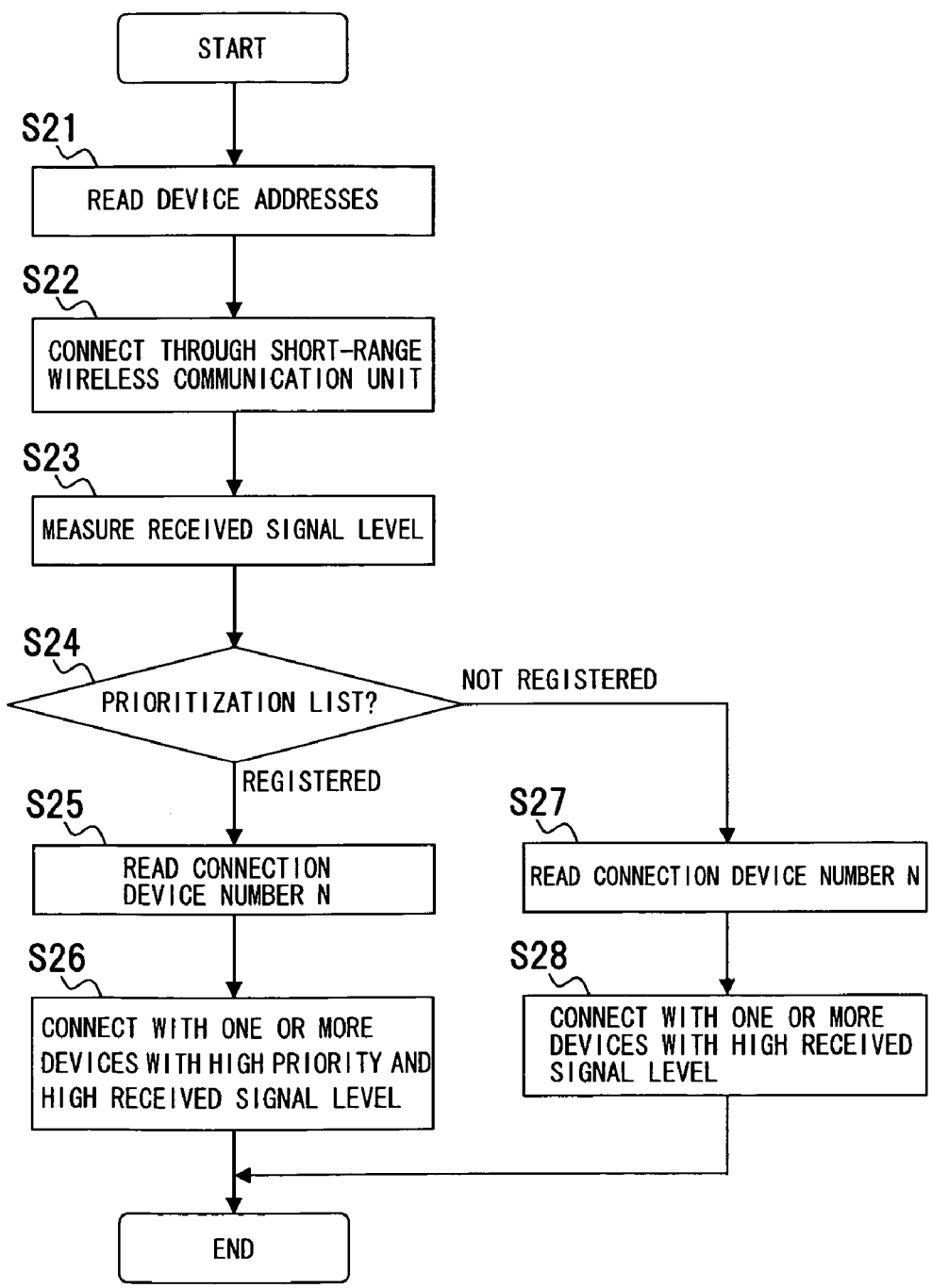
FIG. 8 is a flowchart showing first connection processing.

A first connection method of the cellular phone 4 (FIG. 1) and the device is described with reference to FIG. 8. FIG. 8 is a flowchart showing device connection processing.

In this connection processing, by reading the device addresses registered in the device registration unit 182 of the database 18 (step S21) and by operating the short-range wireless communication unit 10, the devices 61 to 6N corresponding to the device addresses are periodically and automatically connected in the short-range wireless communication (step S22). With this connection, the short-range wireless communication unit 10 periodically measures the received signal levels of the radio signals received by the short-range wireless communication unit 10 (step S23), and the received signal levels of the devices 61 to 6N corresponding to the device addresses are captured into the processor 8. If the device being connected exists, the received signal level during the connection is periodically measured; the measurement result is notified to the processor 8; and unconnectable devices are ignored.

In order to select the connection destination, the processor 8 searches the prioritization list registration unit 184 of the database 18 to check whether the prioritization list is registered or not (step S24). If the prioritization list exists, the connection device number N is read from the connection device number registration unit 186 (step S25); N=1 or more devices 61 to 6N with higher priorities are selected from the registered device addresses; if a plurality of the device addresses has the same priority and if some devices will be connected out of those device addresses, N=1 or more devices 61 to 6N with higher received signal levels are selected out of those device addresses; the short-range wireless communication unit 10 is notified that the devices will be connected; and the short-range wireless communication unit 10 is connected to the one or more devices 61 to 6N with higher received signal levels which are the connection destinations (step S26).

If the prioritization list does not exist, the connection device number N is read from the connection device number registration unit 186 (step S27); N=1 or more devices with higher received signal levels are selected; the devices are notified to the short-range wireless communication unit 10; and the short-range wireless communication unit 10 is connected to the one or more devices with higher received signal levels (step S28).

In this case, the short-range wireless communication unit 10 automatically connects with a device not in a connected state and if connection has been established with a device different from the device address to be connected, after canceling the connection, a device is changed to the device having a higher received signal level which is to be connected.

Figure 9:
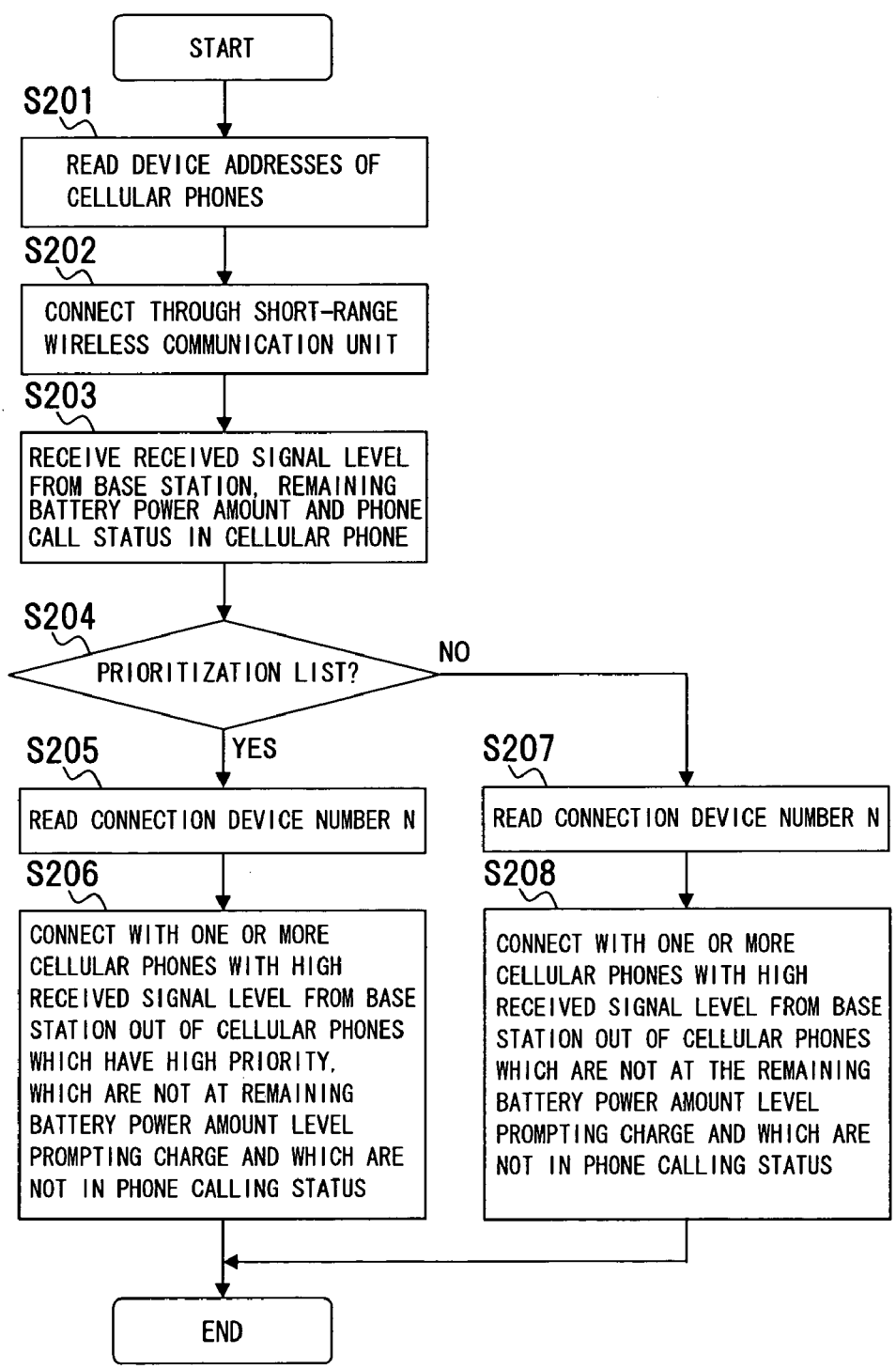
FIG. 9 is a flowchart showing second connection processing.

A second connection method of the cellular phone 4 (FIG. 1) and a cellular phone is described with reference to FIG. 9. FIG. 9 is a flowchart showing a device connection processing.

In this case, in order to facilitate descriptions, as an example of the device 61 to 6N, cellular phones 61 to 6N are described. In this connection processing, by reading the device addresses registered in the device registration unit 182 of the database 18 (step S201) and by operating the short-range wireless communication unit 10, the cellular phones 61 to 6N corresponding to the device addresses are periodically and automatically connected in the short-range wireless communication (step S202) By communication in this connection, the short-range wireless communication unit 10 receives the received signal levels from the base station of the cellular phones 61 to 6N corresponding to the device addresses, the remaining battery power amounts of the cellular phones 61 to 6N and the phone call statuses, which are captured into the processor 8 (step S203). If the cellular phone being connected exists, by the communication during the connection, the short-range wireless communication unit 10 is notified of the received signal level from the base station, the remaining battery power amount and the phone call status, at the time of the connection or when these states are changed, which are captured into the processor 8. Unconnectable cellular phones are ignored.

In order to select the connection destination, the processor 8 searches the prioritization list registration unit 184 of the database 18 to check whether the prioritization list is registered or not (step S204). If the prioritization list exists, the connection device number N is read from the connection device number registration unit 186 (step S205) to select N=1 or more cellular phones 61 to 6N with higher priorities from the registered device addresses; if a plurality of the device addresses has the same priority and if some cellular phones will be connected out of those device addresses, N=1 or more cellular phones 61 to 6N are selected out of those device addresses, which are not in the phone calling status, which are not at the remaining battery power amount level prompting charge and which have a higher received signal level from the base station; the short-range wireless communication unit 10 is notified that the cellular phones will be connected; and the short-range wireless communication unit 10 is connected to the one or more cellular phones 61 to 6N selected as the connection destinations (step S206).

If the prioritization list does not exist, the connection device number N is read from the connection device number registration unit 186 (step S207); N=1 or more cellular phones 61 to 6N are selected, which are not in the phone calling status, which are not at the remaining battery power amount level prompting charge and which have a higher received signal level from the base station; the cellular phones are notified to the short-range wireless communication unit 10; and the short-range wireless communication unit 10 is connected to the one or more cellular phones 61 to 6N selected as the connection destinations (step S208).

In this case, the short-range wireless communication unit 10 automatically connects with a cellular phone not in a connected state and if connection has been established with a cellular phone different from the device address to be connected, after canceling the connection, a cellular phone is changed to the cellular phone not in the phone calling status, not at the remaining battery power amount level prompting charge and having a higher received signal level from the base station, which is to be connected.

Figure 10:
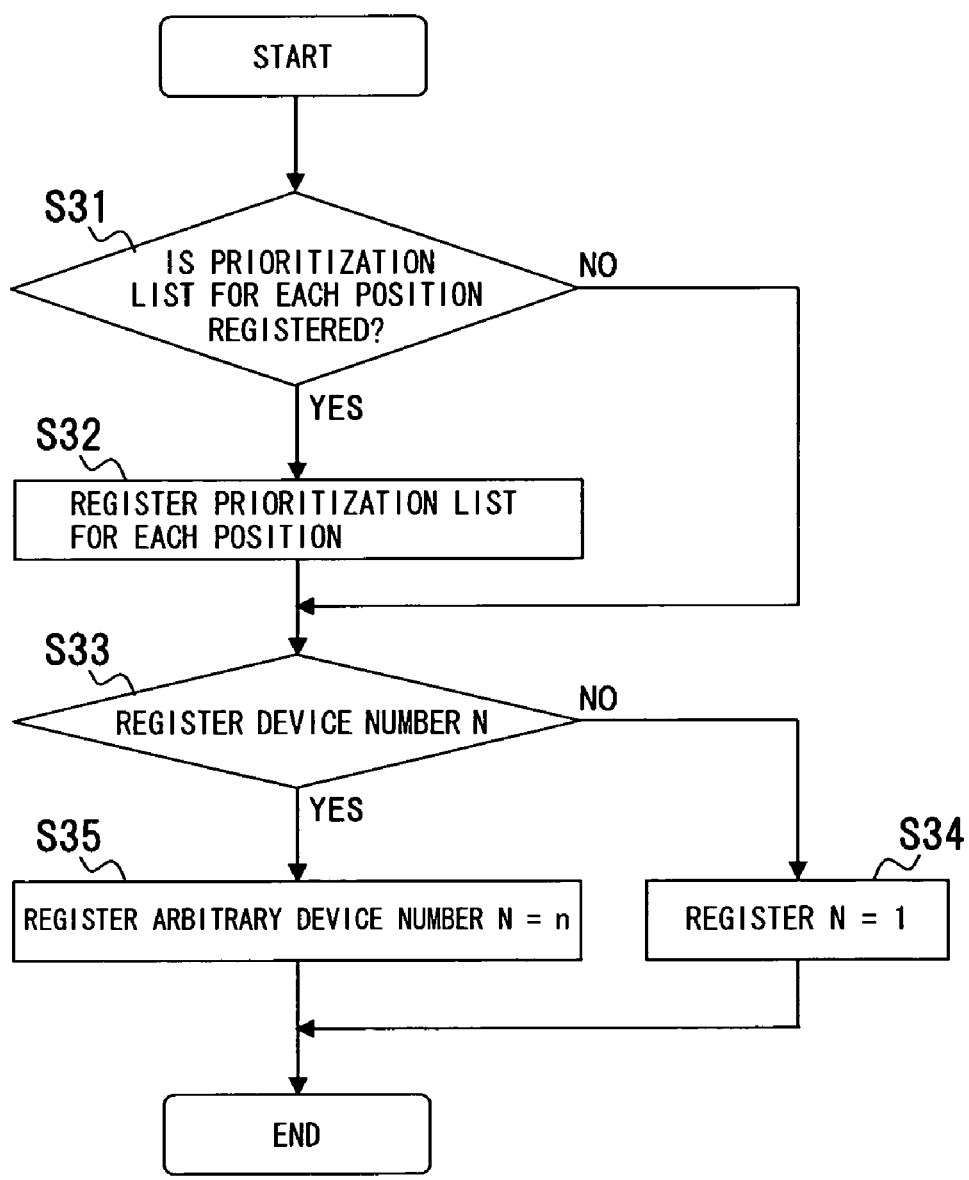
FIG. 10 is a flowchart showing second device registration processing.

A second registration method of the cellular phone 4 (FIG. 1) and the device is described with reference to FIG. 10. FIG. 10 is a flowchart showing device registration processing including registration of the prioritization list for each position.

Although the arbitrary prioritization list is registered after the registration of the device addresses in the registration processing described above (FIG. 7), this registration processing (FIG. 10) is the case that the prioritization list for each position is registered after the device registration (steps S11 and S12, FIG. 7) or after the registration of the, prioritization list (step S14, FIG. 7).

In this registration processing, the prioritization list acceptance unit 14 accepts whether the prioritization list for each position is registered or not (step S31). If such registration is performed, the registration request is notified from the prioritization list acceptance unit 14 to the processor 8 to register the prioritization list for each position (step S32). In this case, when position information such as a place name is input from the UI 34, the place name is notified to the prioritization list acceptance unit 14 and displayed on the display unit 26 to be checked by the user. When the position information representing the place name is notified to the processor 8, the processor 8 read map information preliminary stored into the database 18 or read the map information from a server connected to the telephone wireless communication unit 24 via network, and the map information is notified to the prioritization list registration unit 184. The map information is displayed on the display unit 26, and the user selects an area on the map desired to be registered into the prioritization list by specifying with a cursor, etc. For example, a distance range within a radius r from the center may be selected for the area registration. For example, in the case of a range within a radius of 10 [m] from a home, priorities may be set as shown in table 3.

TABLE 3

| Range within a radius of 10 [m] from a home | |
| --- | --- |
| Priority | registered device |
| First priority | device address of device 61 |
| second priority | device address of device 62 |
| Third priority | device address of device 63 |

In the case of a range except within a radius of 10 [m] from a home, priorities may be set as shown in table 4.

TABLE 4

| Range except within a radius of 10 [m] from a home | |
| --- | --- |
| Priority | registered device |
| First priority | device address of device 62 |
| second priority | device address of device 61 |
| Third priority | device address of device 63 |

The prioritization list for each position set in this way is notified from the prioritization list acceptance unit 14 to the processor 8, and a registration instruction is transmitted to the processor 8 to store the prioritization list for each position to the prioritization list registration unit 184 of the database 18 (step S32).

After the device registration with the priority for each position added, an inquiry is performed for the registration of the number N of the devices connected concurrently (step S33) and if the prioritization list for each position is not registered, the procedure also proceeds to step S33. If the device number N is not registered, N=1 is forcibly registered (step S34), and if the device number N=n is registered, the desired device number N=n is registered (step S35). In this case, the connection device number N is registered for each priority.

Figure 11:
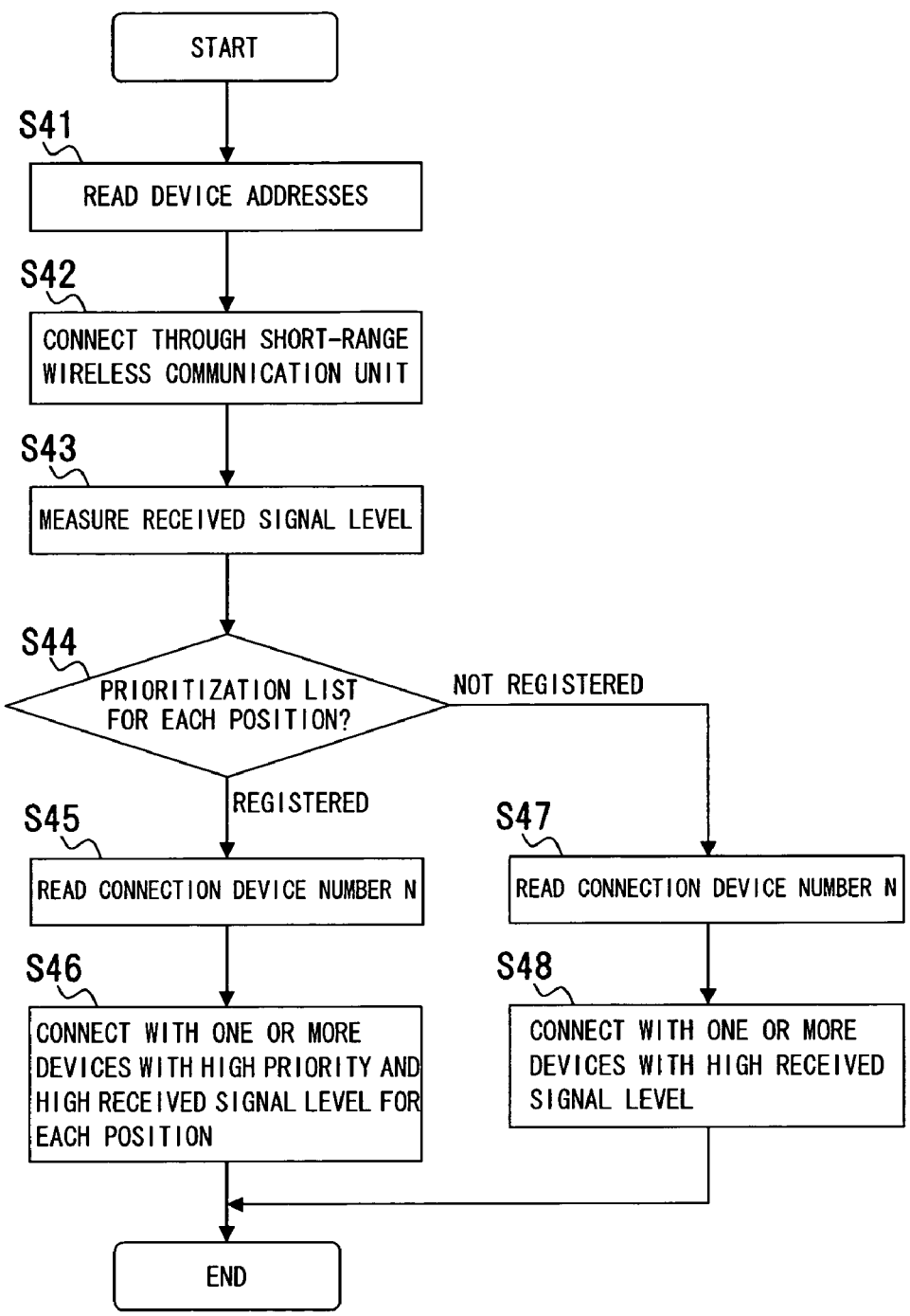
FIG. 11 is a flowchart showing third connection processing.

A third connection method of the cellular phone 4 (FIG. 1) and the device is described with reference to FIG. 11. FIG. 11 is a flowchart showing device connection processing in the case that the prioritization list for each position is provided.

In this connection processing, by reading the device addresses registered in the device registration unit 182 of the database 18 (step S41) and by operating the short-range wireless communication unit 10, the devices 61 to 6N corresponding to the device addresses are periodically and automatically connected in the short-range wireless communication (step S42). With this connection, the short-range wireless communication unit 10 periodically measures the received signal levels of the radio signals received by the short-range wireless communication unit 10 (step S43), and the received signal levels of the devices 61 to 6N corresponding to the device addresses are captured into the processor 8. If the device being connected exists, the received signal level during the connection is periodically measured; the measurement result is notified to the processor 8; and unconnectable devices are ignored.

In order to select the connection destination, the processor 8 searches the prioritization list registration unit 184 of the database 18 to check whether the prioritization list for each position is registered or not (step S44). If the prioritization list for each position exists, the connection device number N is read from the connection device number registration unit 186 (step S45); N=1 or more devices 61 to 6N with higher priorities are selected from the registered device addresses; if a plurality of the device addresses has the same priority and if some devices will be connected out of those device addresses, N=1 or more devices 61 to 6N with higher received signal levels are selected out of those device addresses; the short-range wireless communication unit 10 is notified that the devices will be connected; and the short-range wireless communication unit 10 is connected to the one or more devices 61 to 6N with higher received signal levels which are the connection destinations (step S46).

If the prioritization list for each position does not exist, the connection device number N is read from the connection device number registration unit 186 (step S47); N=1 or more devices with higher received signal levels are selected; the devices are notified to the short-range wireless communication unit 10; and the short-range wireless communication unit 10 is connected to the one or more devices with higher received signal levels (step S48).

In this case, the short-range wireless communication unit 10 automatically connects with a device not in a connected state and if connection has been established with a device different from the device address to be connected, after canceling the connection, a device is changed to the device having a higher received signal level which is to be connected.

Figure 12:
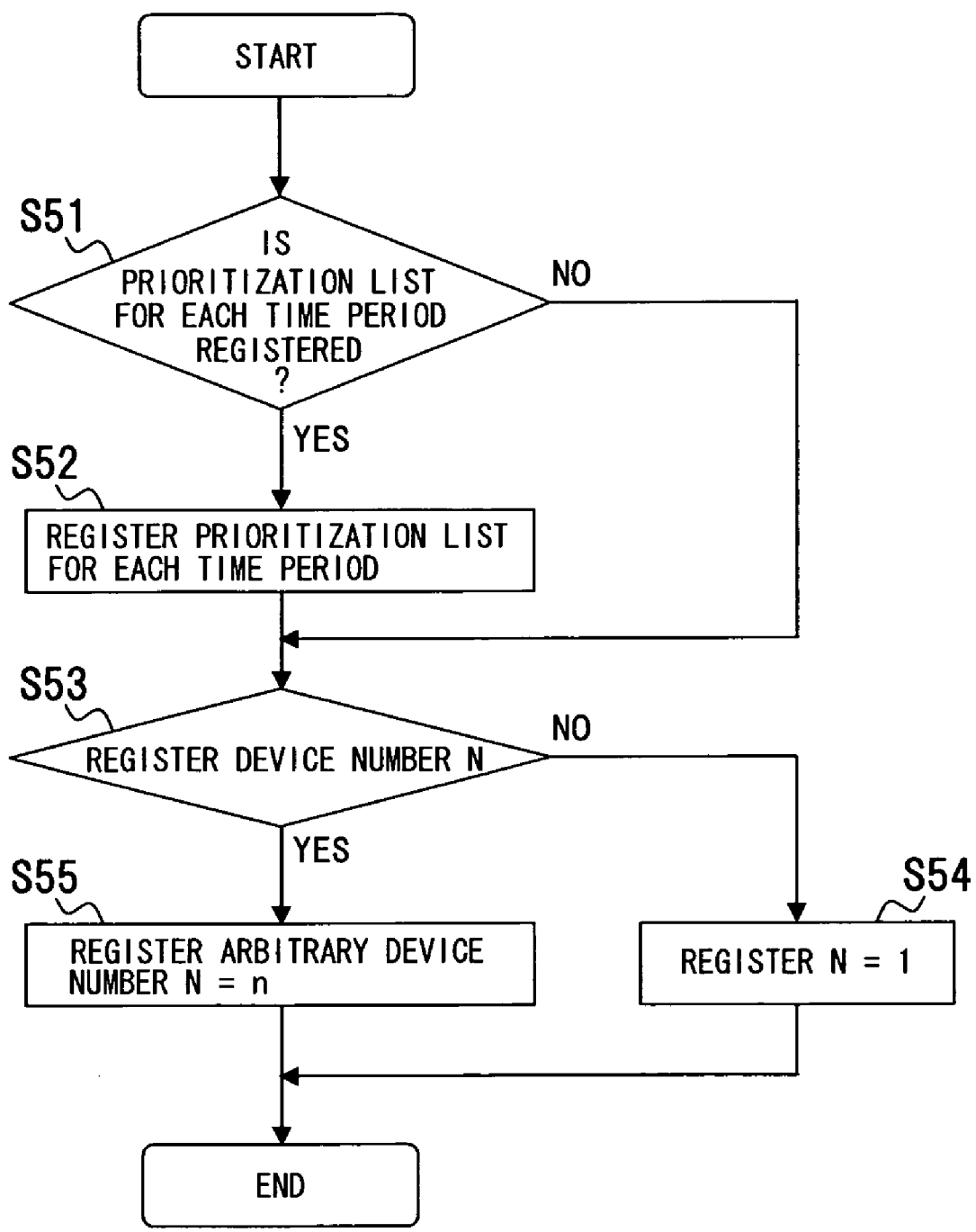
FIG. 12 is a flowchart showing third device registration processing.

A third registration method of the cellular phone 4 (FIG. 1) and the device is described with reference to FIG. 12. FIG. 12 is a flowchart showing device registration processing including registration of the prioritization list for each time period.

Although the arbitrary prioritization list is registered after the registration of the device addresses in the registration processing described above (FIG. 7), this registration processing (FIG. 12) is the case that the prioritization list for each time period is registered after the device registration (steps S11 and S12, FIG. 7), after the registration of the prioritization list (step S14, FIG. 7) or after the registration of the prioritization list for each position (step S32, FIG. 10).

In this registration processing, the prioritization list acceptance unit 14 accepts whether the prioritization list for each time period is registered or not (step S51). If such registration is performed, the registration request is notified from the prioritization list acceptance unit 14 to the processor 8 to register the prioritization list for each time period (step S52). In this case, when time information is input from the UI 34, the time period is notified to the prioritization list acceptance unit 14 and displayed on the display unit 26 to be checked by the user. The time information is notified to the processor 8 and the prioritization list for each time period is stored into the prioritization list registration unit 184 of the database 18 (step S52). For example, in the case of a time period of 7:00 to 23:00, priorities may be set as shown in table 5.

TABLE 5 time period: 7:00 to 23:00

| priority | registered device |
|---|---|
| First priority | device address of device 61 |
| second priority | device address of device 62 |
| Third priority | device address of device 63 |

For example, in the case of a time period except 7:00 to 23:00, priorities may be set as shown in table 6.

TABLE 6 time period except 7:00 to 23:00

| priority | registered device |
|---|---|
| First priority | device address of device 62 |
| second priority | device address of device 61 |

The prioritization list for each time period set in this way is notified from the prioritization list acceptance unit 14 to the processor 8, and a registration instruction is transmitted to the processor 8 to store the prioritization list for each time period to the prioritization list registration unit 184 of the database 18 (step S52).

After the device registration with the priority for each time period added, an inquiry is performed for the registration of the number N of the devices connected concurrently (step S53). If the prioritization list for each time period is not registered, the procedure also proceeds to step S53. If the device number N is not registered, N=1 is forcibly registered (step S54), and if the device number N=n is registered, the desired device number N=n is registered (step S55). In this case, the connection device number N is registered for each priority.

Figure 13:
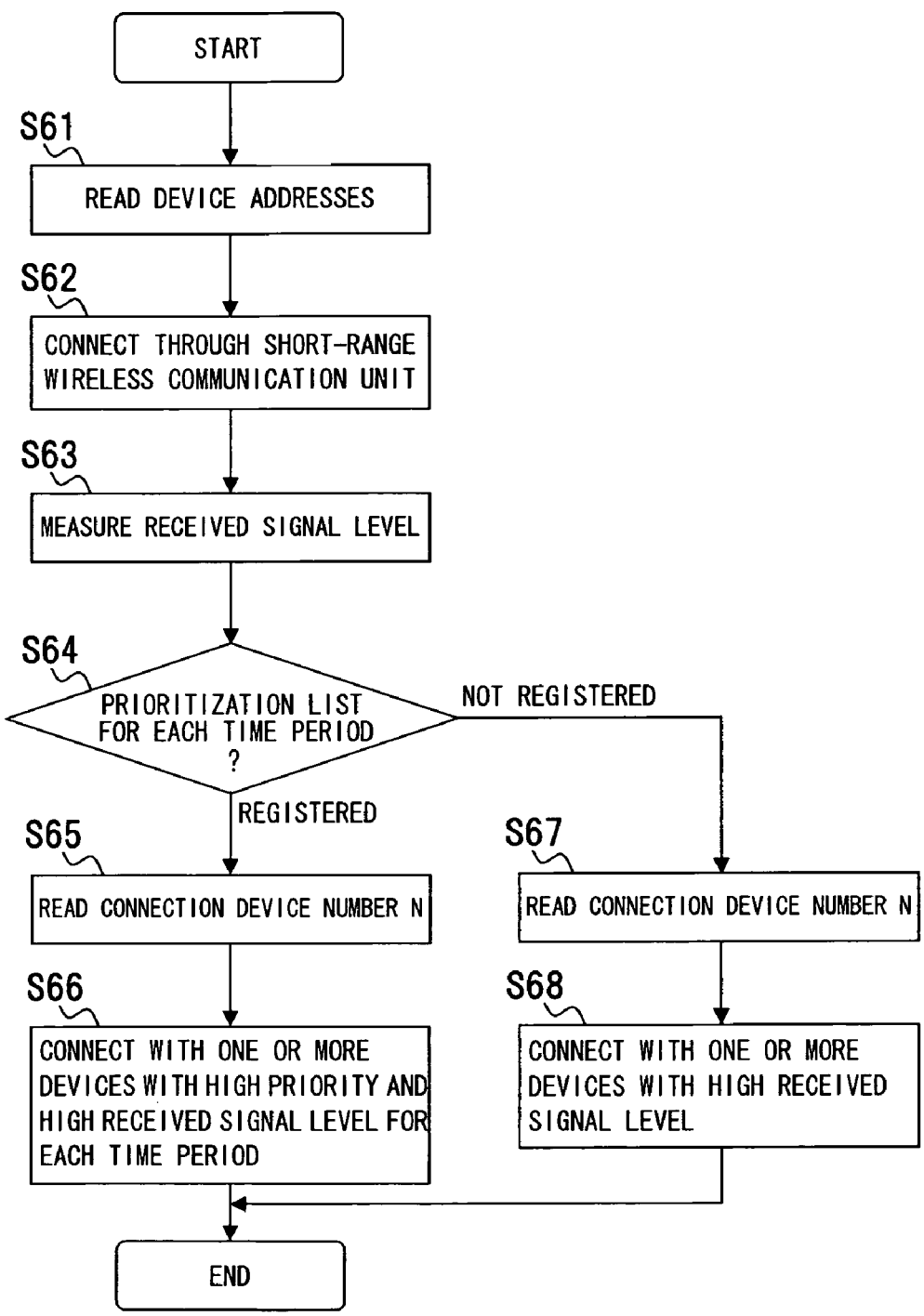
FIG. 13 is a flowchart showing fourth connection processing.

A fourth connection method of the cellular phone 4 (FIG. 1) and the device is described with reference to FIG. 13. FIG. 13 is a flowchart showing device connection processing in the case that the prioritization list for each time period is provided.

In this connection processing, by reading the device addresses registered in the device registration unit 182 of the database 18 (step S61) and by operating the short-range wireless communication unit 10, the devices 61 to 6N corresponding to the device addresses are periodically and automatically connected in the short-range wireless communication (step S62). With this connection, the short-range wireless communication unit 10 periodically measures the received signal levels of the radio signals received by the short-range wireless communication unit 10 (step S63), and the received signal levels of the devices 61 to 6N corresponding to the device addresses are captured into the processor 8. If the device being connected exists, the received signal level during the connection is periodically measured; the measurement result is notified to the processor 8; and unconnectable devices are ignored.

In order to select the connection destination, the processor 8 searches the prioritization list registration unit 184 of the database 18 to check whether the prioritization list for each time period is registered or not (step S64). If the prioritization list for each time period exists, the connection device number N is read from the connection device number registration unit 186 (step S65); N=1 or more devices 61 to 6N with higher priorities are selected from the registered device addresses; if a plurality of the device addresses has the same priority and if some devices will be connected out of those device addresses, N=1 or more devices 61 to 6N with higher received signal levels are selected out of those device addresses; the short-range wireless communication unit 10 is notified that the devices will be connected; and the short-range wireless communication unit 10 is connected to the one or more devices 61 to 6N with higher received signal levels which are the connection destinations (step S66).

If the prioritization list for each time period does not exist, the connection device number N is read from the connection device number registration unit 186 (step S67); N=1 or more devices with higher received signal levels are selected; the devices are notified to the short-range wireless communication unit 10; and the short-range wireless communication unit 10 is connected to the one or more devices with higher received signal levels (step S68).

In this case, the short-range wireless communication unit 10 automatically connects with a device not in a connected state and if connection has been established with a device different from the device address to be connected, after canceling the connection, a device is changed to the device having a higher received signal level which is to be connected.

Figure 14:
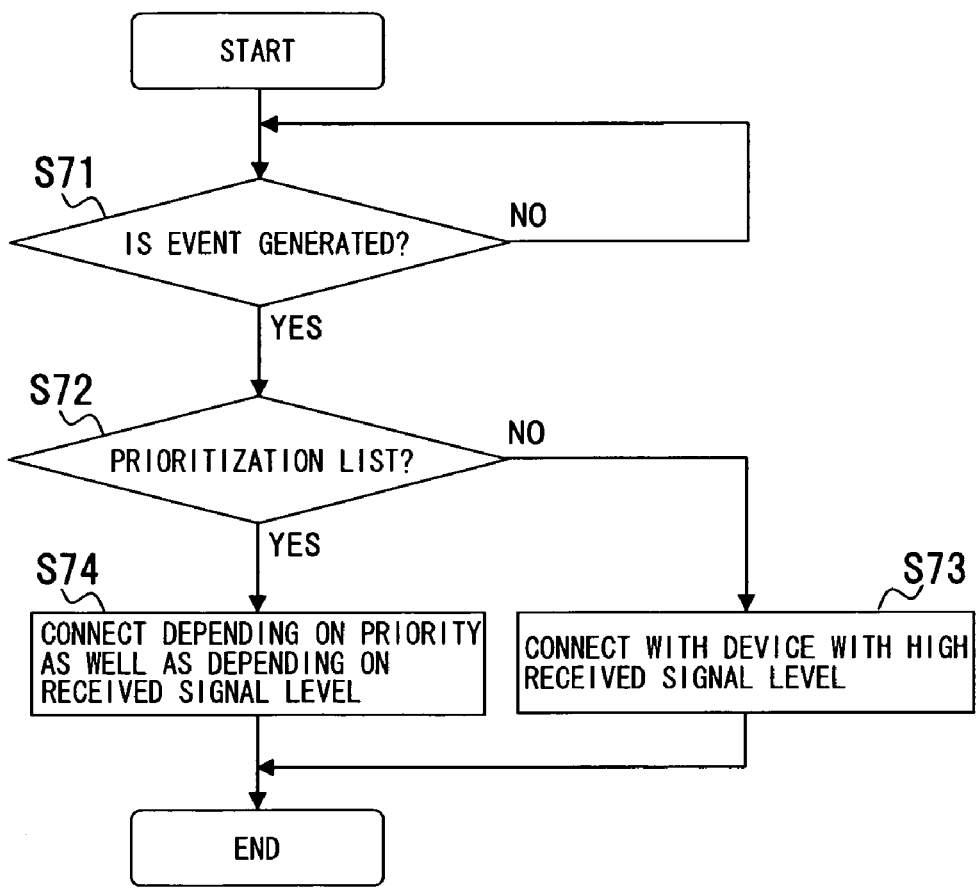
FIG. 14 is a flowchart showing connection processing.

Connection processing due to generation of a connection event is described with reference to FIG. 14. FIG. 14 is a flowchart showing connection processing due to generation of a connection event.

In the cellular phone 4, in a waiting state, it is monitored whether a connection event is generated for an incoming phone call or incoming e-mail (step S71). If a connection event is generated, with a notification from the telephone wireless communication unit 24, the processor 8 searches the prioritization list registration unit 184 of the database 18 to check whether the prioritization list exists or not (step S72). If the prioritization list is not registered, based on the received signal levels in the short-range wireless communication, devices are connected depending on the connection device number N of the connection device number registration unit 186 (step S73). As described in the flowchart of FIG. 8, this processing is processing for reading the device addresses (step S21), connecting by the short-range wireless communication unit 10 (step S22), measuring the received signal levels (step S23), reading the connection device number N (step S27) and connecting with one or more devices with higher received signal levels (step S28).

If the prioritization list exists, the prioritization list is searched to determine whether the prioritization list is:
  (a) an arbitrarily registered prioritization list;
  (b) a prioritization list dependent on a position; or
  (c) a prioritization list dependent on a time period, and connection is performed depending on the prioritization list (step S74).

With regard to this connection depending on the prioritization list (step S74), in the case of the arbitrarily registered prioritization list, processing is performed for reading the connection device number N (step S25) and for connecting one or more devices with higher priorities and higher received signal levels (step S26) as in the flowchart (FIG. 8) described above.

In the case of the prioritization list dependent on a position, processing is performed for reading the connection device number N (step S45) and for connecting one or more devices with higher priorities and higher received signal levels for each position (step S46) as in the flowchart (FIG. 11) described above.

In the case of the prioritization list dependent on a time period, processing is performed for reading the connection device number N (step S65) and for connecting one or more devices with higher priorities and higher received signal levels for each time period (step S66) as in the flowchart (FIG. 13) described above.

The reception notification is displayed and notified on the display unit 614, etc. of the device 61, etc. connected to the cellular phone 4. In this case, for example, a phone call can be performed on the device 61 with the voice transmission/reception unit 616 through the mediation of the short-range wireless communication.

Second Embodiment

Figure 15:
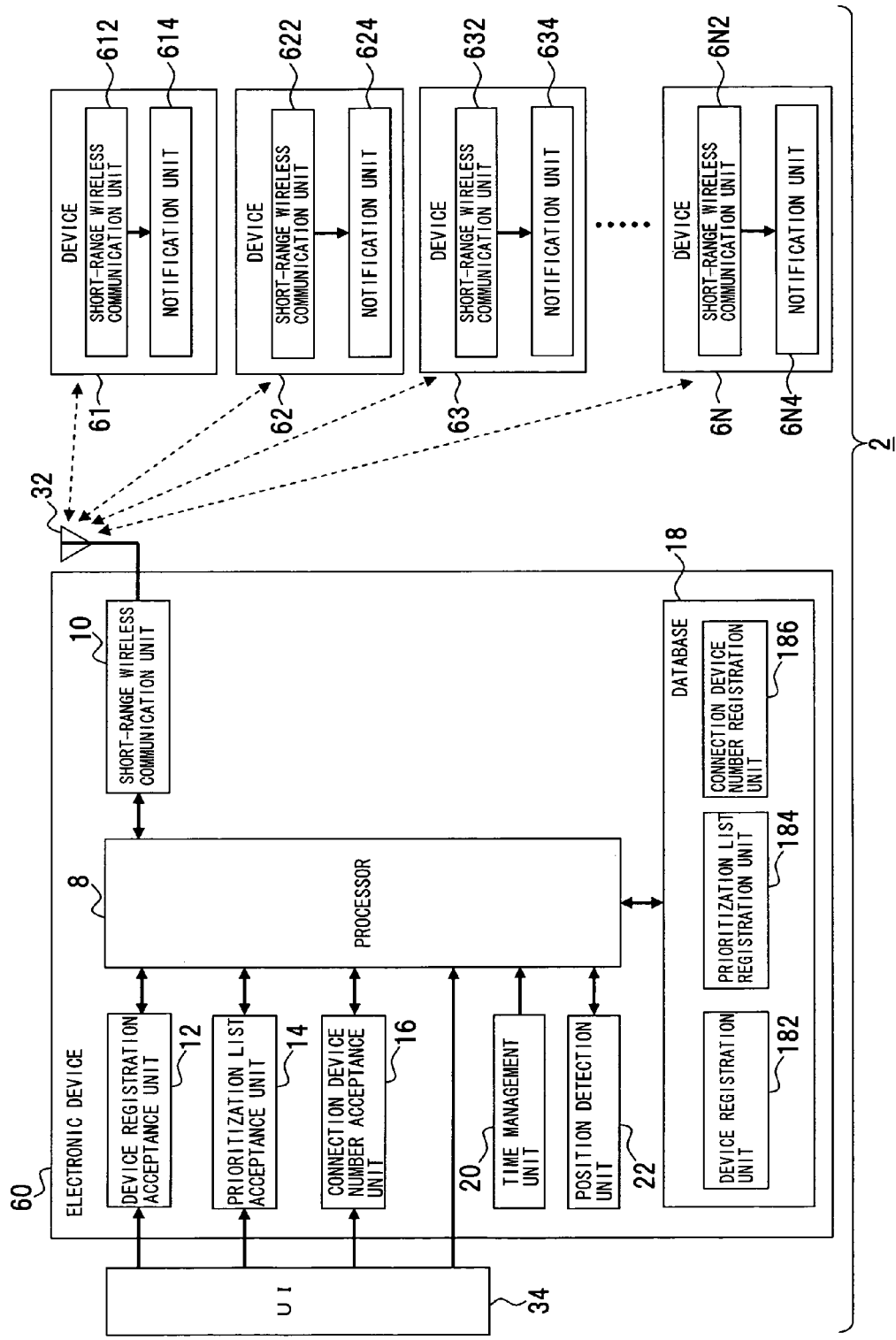
FIG. 15 is a block diagram showing a dynamic priority connection system according to a second embodiment.

A second embodiment of the present invention is described with reference to FIG. 15. FIG. 15 is a block diagram showing the second embodiment of an inter-device priority connection apparatus. In FIG. 15, the same symbols are added to the portions same as the priority connection apparatus of FIG. 1 and the descriptions thereof are omitted.

In the first embodiment, although the cellular phone 4 is illustrated as a certain device, the device may be configured as an electronic device 60 other than the cellular phone and may be configured to perform the priority connection with other devices 61 to 6N in the short-range wireless communication. The electronic device 60 can be configured as an information processing terminal, a household electric device, etc. as is the case with other devices 61 to 6N.

In such a configuration, the registration and connection can be performed for the priorities, etc. in the prioritization list and the received signal level as described above, which can be utilized for giving and receiving of information, notification of an event, etc.

Third Embodiment

Figure 16:
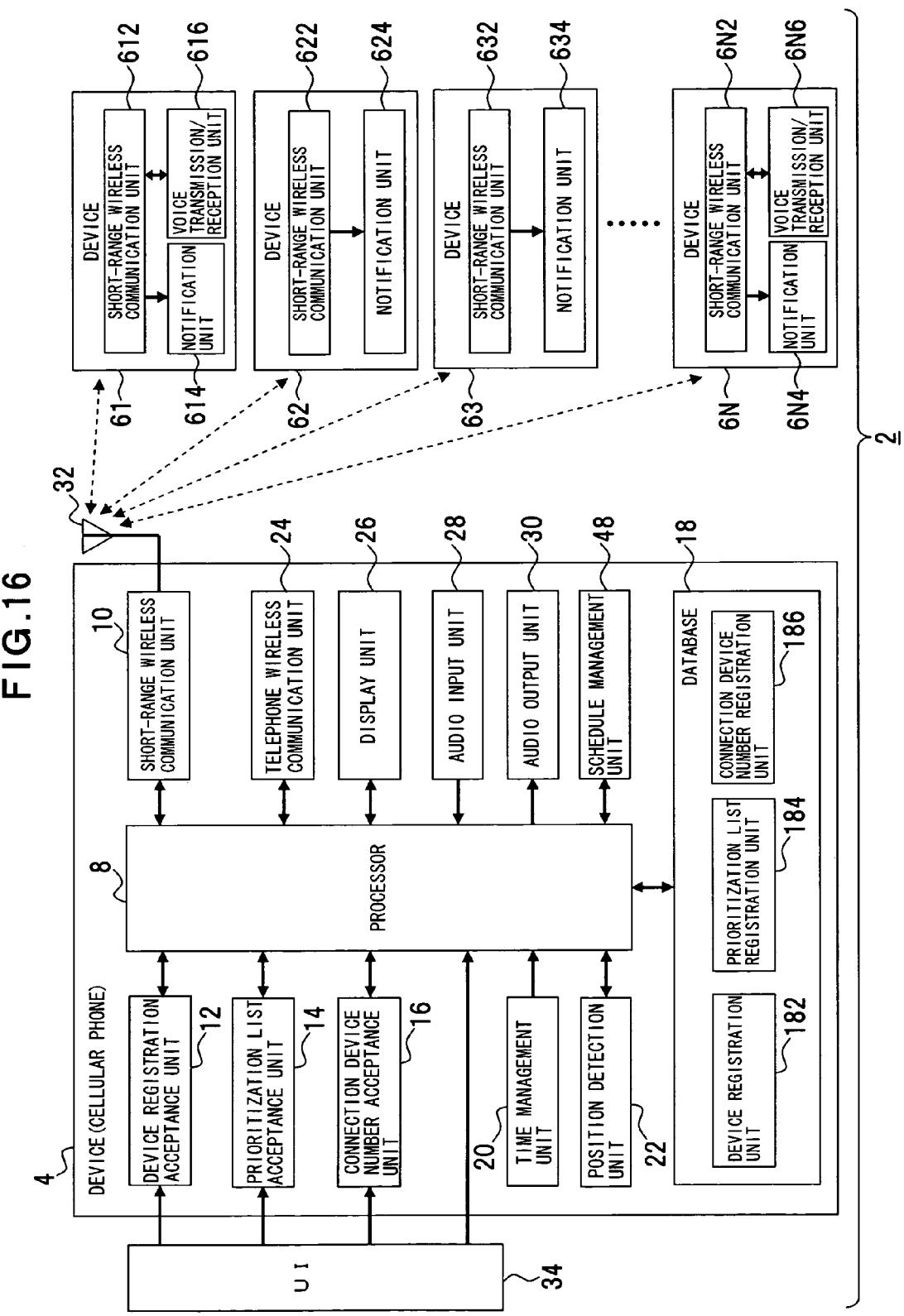
FIG. 16 is a block diagram showing a dynamic priority connection system according to a third embodiment.

A third embodiment of the present invention is described with reference to FIG. 16. FIG. 16 is a block diagram showing the third embodiment of an inter-device priority connection apparatus. In FIG. 16, the same symbols are added to the portions same as the priority connection apparatus of FIG. 1 and the descriptions thereof are omitted.

The cellular phone 4 in this embodiment is provided with a schedule management unit 48 for referring to calendar information and time information to output notification information such as a schedule display and an advance notice alarm registered from the UI 34. The notification information is displayed on the display unit 26 and is notified by the connection with one or more devices selected from the device 61 to 6N through the short-range wireless signals via the short-range wireless communication unit 10.

Figure 17:
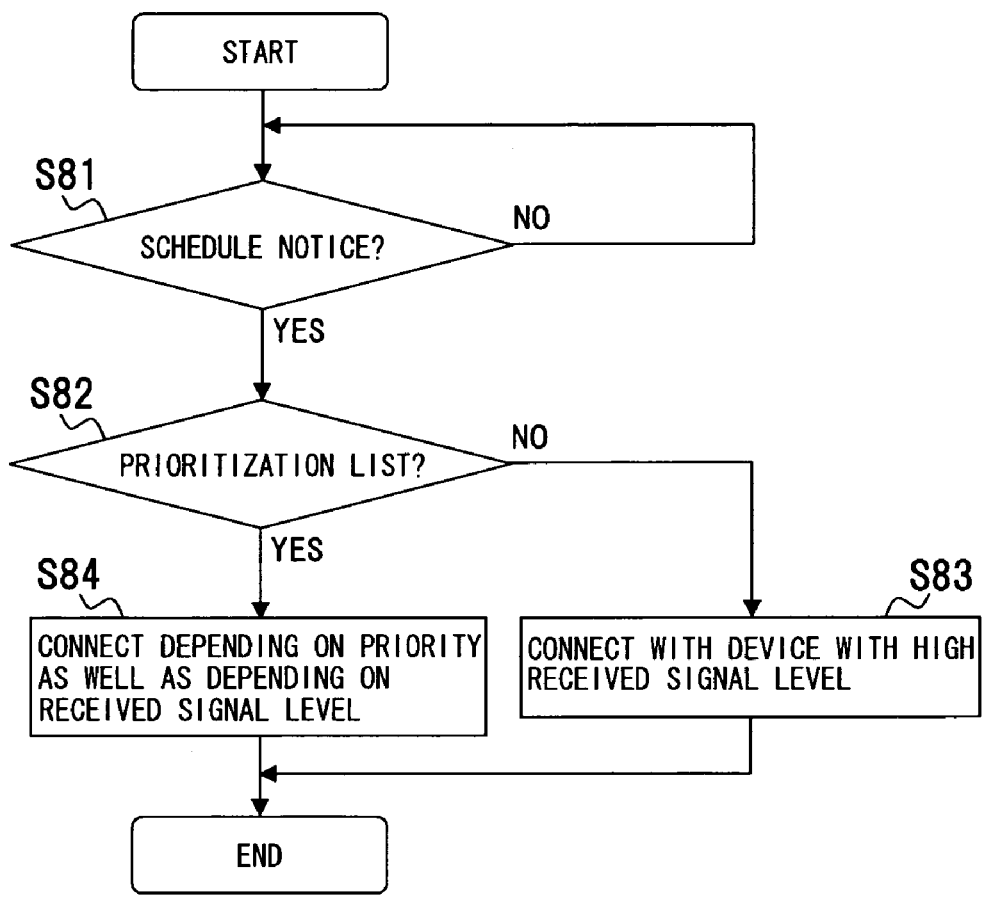
FIG. 17 is a flowchart showing connection processing.

As the generation of the connection event, the connection processing due to generation of a schedule notice is described with reference to FIG. 17. FIG. 17 is a flowchart showing connection processing due to generation of a schedule notice.

In the cellular phone 4, in a waiting state, it is monitored whether a schedule display or schedule notification is generated or not (step S81). In the case of the schedule display or schedule notification, with a notification from the schedule management unit 48, the processor 8 searches the database 18 to check whether the prioritization list exists or not (step S82). If the prioritization-list is not registered, based on the received signal levels in the short-range wireless communication, devices are connected depending on the connection device number N of the connection device number registration unit 186 (step S83). As described in the flowchart of FIG. 8, this processing is processing for reading the device addresses (step S21), connecting by the short-range wireless communication unit 10 (step S22), measuring the received signal levels (step S23), reading the connection device number N (step S27) and connecting with one or more devices with higher received signal levels (step S28).

If the prioritization list exists, the prioritization list is searched to determine whether the prioritization list is the arbitrarily registered prioritization list, the prioritization list dependent on a position or the prioritization list dependent on a time period, and the connection is performed depending on the prioritization list, as described above (step S84).

With regard to this connection depending on the prioritization list (step S84), in the case of the arbitrarily registered prioritization list, processing is performed for reading the connection device number N (step S25) and for connecting one or more devices with higher priorities and higher received signal levels (step S26) as in the flowchart (FIG. 8) described above.

In the case of the prioritization list dependent on a position, processing is performed for reading the connection device number N (step S45) and for connecting one or more devices with higher priorities and higher received signal levels for each position (step S46) as in the flowchart (FIG. 11) described above.

In the case of the prioritization list dependent on a time period, processing is performed for reading the connection device number N (step S65) and for connecting one or more devices with higher priorities and higher received signal levels for each time period (step S66) as in the flowchart (FIG. 13) described above.

With this connection, the schedule display or schedule notification is performed on the connected device and the user can know the content from the device at hand.

Fourth Embodiment

Figure 18:
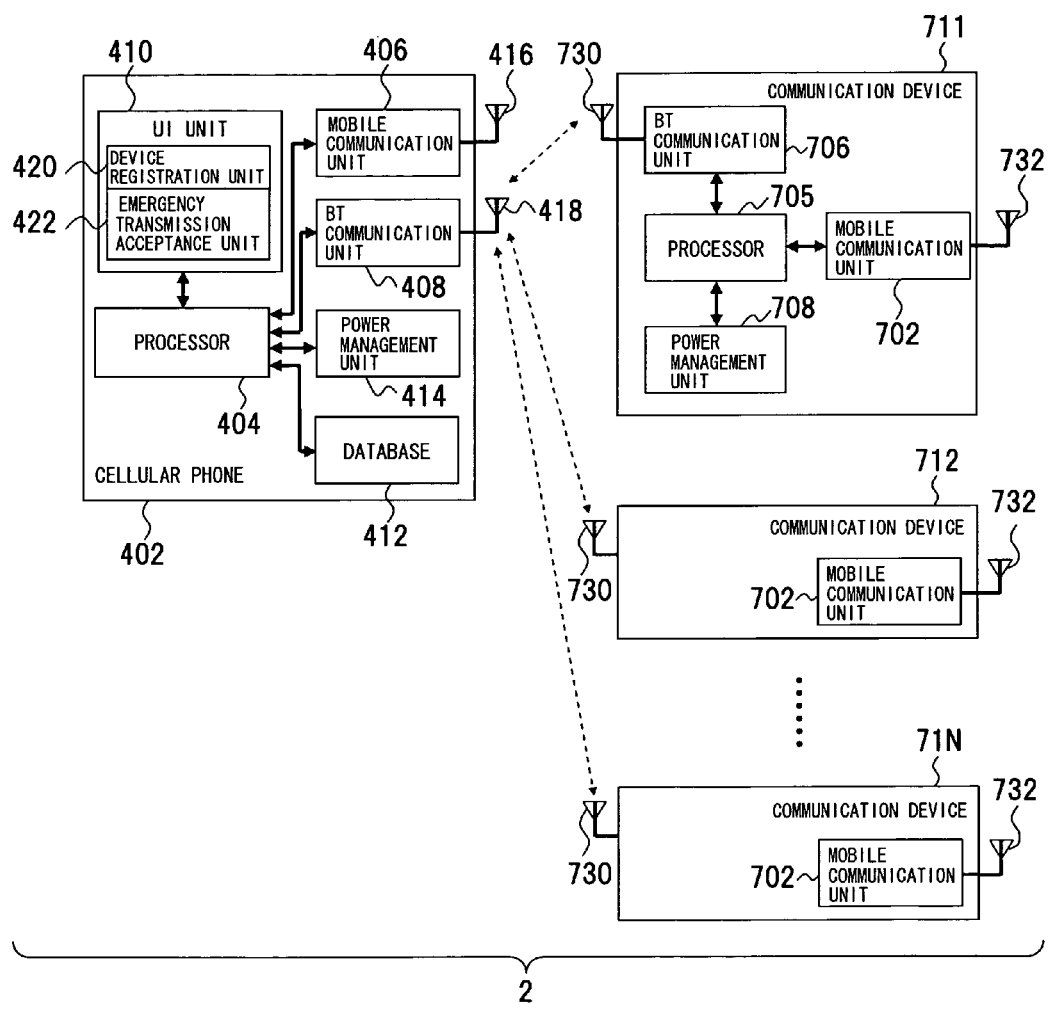
FIG. 18 is a diagram showing a dynamic priority connection system according to a fourth embodiment.
Figure 19:
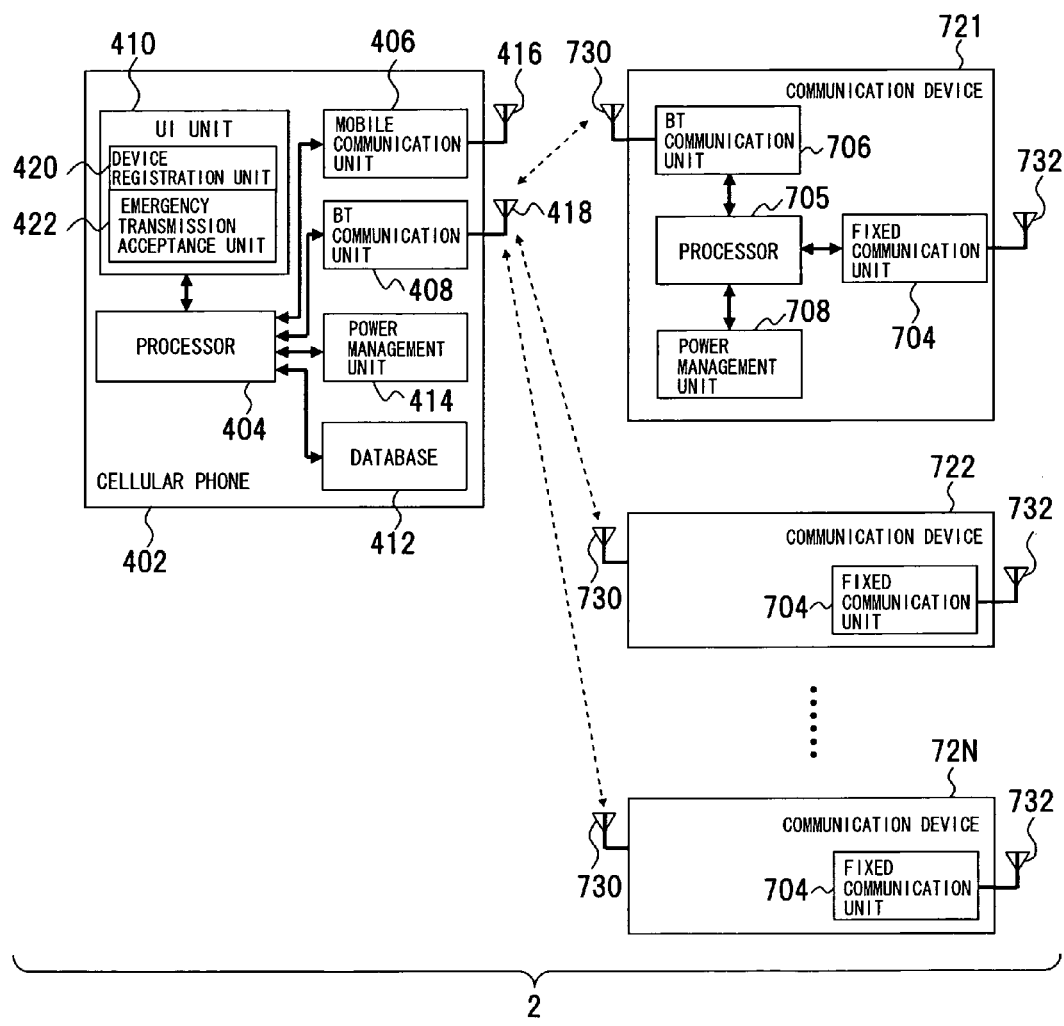
FIG. 19 is a diagram showing a dynamic priority connection system.
Figure 20:
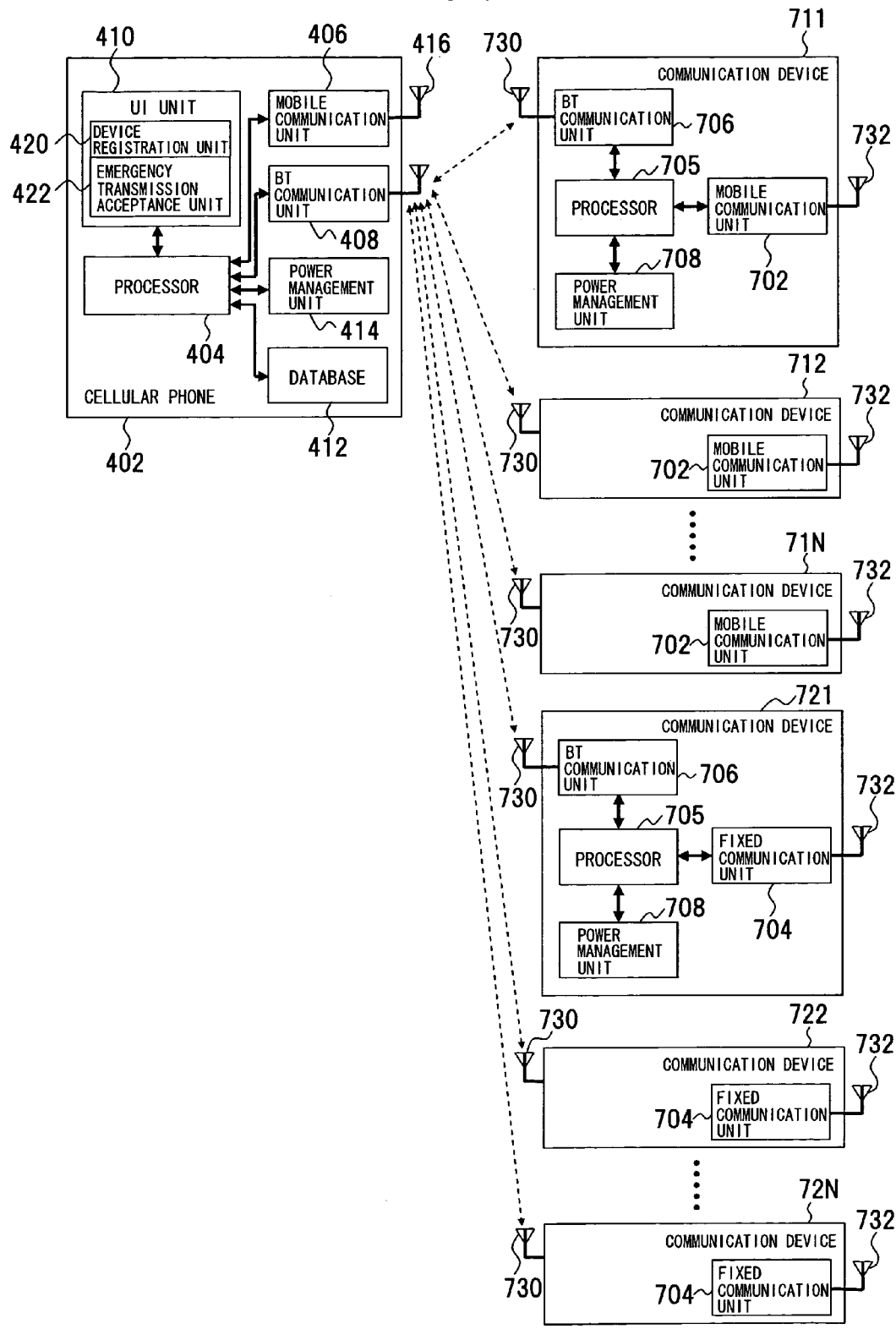
FIG. 20 is a diagram showing a dynamic priority connection system.

A fourth embodiment of the present invention is described with reference to FIG. 18, FIG. 19 and FIG. 20. FIGS. 18 to 20 are block diagrams shown the fourth embodiment of the inter-device priority connection apparatus; FIG. 18 is a block diagram showing the case of using a communication device comprising a mobile communication unit; FIG. 19 is a block diagram showing the case of using a communication device comprising a fixed communication unit; and FIG. 20 is a block diagram showing the case of using both a communication device comprising a mobile communication unit and a communication device comprising a fixed communication unit. In FIGS. 18 to 20, the same symbols are added to the portions same as the priority connection apparatus of FIG. 1.

The fourth embodiment is configured to perform an emergency notification from an electronic device comprising, for example, a Bluetooth communication function as a short-range wireless communication function through a communication device comprising a Bluetooth communication function. A selection factor is defined as whether a remaining battery power amount, a received signal level, a linkage with public line network, etc. of the communication device transited by the emergency notification are appropriate as a device transited by the notification or not. In this case, the electronic device may be an information terminal device such as a cellular phone, an in-vehicle device, a personal computer, etc. and a household electric device such as a television set, a watch, a refrigerator, etc. The communication device may be any devices equipped with a communication function, such as a cellular phone, a fixed telephone, etc.

A dynamic priority connection system 2 is comprised of a cellular phone 402 as the above-described electronic device comprising the Bluetooth communication function and a plurality of communication devices 711, 712 ... 71N transited by an emergency notification transmitted from this cellular phone 402 and is configured by using each communication unit 711 to 71N comprising a mobile communication unit 702, or is configured by using each communication unit 721, 722 ... 72N comprising a fixed communication unit 704 as shown in FIG. 19, or may be configured by using both of each communication device 711 to 71N comprising the mobile communication unit 702 and each communication device 721 to 72N comprising the fixed communication unit 704 as shown in FIG. 20. In other words, the system shown in FIG. 18 is an example of selecting a communication device optimal for a transit device of emergency transmission from communication devices such as cellular phones; the system shown in FIG. 19 is an example of selecting a communication device optimal for a transit device of emergency transmission from communication devices such as fixed phones; and the system shown in FIG. 20 is an example of selecting a communication device optimal for a transit device of emergency transmission from communication devices including mobile telephones and fixed telephones. The fixed communication unit 704 is a communication function unit in wired connection or wireless connection. A communication destination is selected from the communication devices 711 to 71N or the communication devices 721 to 72N, and emergency transmission is performed with the communication destination. In the dynamic priority connection system 2, the communication devices 711 to 71N are devices comprising communication functions, such as cellular phones and PHSs (Personal Handyphone System), and the communication devices 721 to 72N are stationary telephones such as fixed telephones and pay telephones, which may be devices enabling emergency transmission using the Bluetooth function.

In the dynamic priority connection system 2, the cellular phone 402 is comprised of a processor 404, a mobile communication unit 406, a Bluetooth (BT) communication unit 408, a user interface (UI) unit 410, a database 412, a power management unit 414 and antennas 416, 418.

In this cellular phone 402, the processor 404 is constituted by a computer comprising a CPU (Central Processing Unit), a ROM (Read-Only Memory), a RAM (Random-Access Memory), etc., and controls detection of a device optimal for realizing transmission from a device optimal for emergency notification and the transmission.

The mobile communication unit 406 performs detection of mobile communication network, communication control such as connection and disconnection, and communication. The BT communication unit 408 performs detection of the communication devices 711 to 71N and devices 721 to 72N, communication control such as connection and disconnection, and communication.

The UI unit 410 is comprised of a device registration unit 420 for accepting registration of a device which can be transited at the time of emergency transmission from a user, an emergency transmission acceptance unit 422 for accepting the emergency transmission from the user, etc. To the device registration unit 420, registration is performed for one or more communication devices as devices which can be transited at the time of the emergency transmission as well as a received remaining battery power amount (in the case of a fixed telephone, if the telephone has no power supply and is operated by a battery, a remaining battery power amount is received, or if the telephone has power supply, a remaining battery power amount is received as a sufficient state) and a received signal level (in the case of a fixed telephone, if the telephone can connect with public network in wireless communication, the received signal level thereof is received, or if the telephone can connect with public network in wired communication, for example, it is monitored whether the connection with the public network can be periodically achieved and the received signal level is received as a good state if the connection can be achieved) which are received for each registered communication device 711 to 71N or communication device 721 to 72N.

The database 412 registers addresses of communication devices which can be transited at the time of the emergency transmission and the remaining battery power amount, the received signal level, etc. of each communication device 711 to 71N or communication device 721 to 72N if communication can be achieved with the communication devices 711 to 71N or communication devices 721 to 72N in the Bluetooth communication.

The power management unit 414 manages a remaining battery power amount of a battery equipped in the cellular phone 402 and notifies the processor 404 of the state thereof.

In FIG. 18 and FIG. 20, the communication device 711 to 71N is comprised of a processor 705, a BT communication unit 706, the mobile communication unit 702, a power management unit 708 and antennas 730, 732. The processor 705 as a control unit is constituted by a computer comprising a CPU, a ROM, a RAM, etc. and controls the BT communication unit 706, the mobile communication unit 702, etc. The processor 404 of the cellular phone 402 periodically establishes communication and automatically connects with the one or more communication devices 711 to 71N temporarily, performs automatic connection from a connection waiting state or uses connection in the case that the connection is in progress to inquire the remaining battery power amounts and the received signal levels of the communication devices to receive the results thereof, and at the time of the emergence transmission, if the remaining battery power amount or the received signal level of the cellular phone 402 is low, the processor 404 uses the information to automatically connect with the communication device 711 to 71N which has a high remaining battery power amount or a high received signal level and performs the emergency transmission using the communication device as a transition destination.

In FIG. 19 and FIG. 20, the communication device 721 to 72N is comprised of the processor 705, the BT communication unit 706, the fixed communication unit 704, the power management unit 708 and the antennas 730, 732. The processor 705 as a control unit is constituted by a computer comprising a CPU, a ROM, a RAM, etc. and controls the BT communication unit 706, the fixed communication unit 704, etc. The processor 404 of the cellular phone 402 periodically establishes communication and automatically connects with the one or more communication devices 721 to 72N temporarily, performs automatic connection from a connection waiting state or uses connection in the case that the connection is in progress to inquire the remaining battery power amounts and the received signal levels of the communication devices to receive the results thereof, and at the time of the emergence transmission, if the remaining battery power amount or the received signal level of the cellular phone 4 is low, the processor 404 uses the result to automatically connect with the communication device 721 to 72N which has a high remaining battery power amount or a high received signal level and performs the emergency transmission using the communication device as a transition destination.

By periodically performing communication between the cellular phone 402 and the various communication devices 711 to 71N, 721 to 72N for the temporal connection, for example, the connection in the handsfree profile, the remaining battery power amount levels and the received signal levels of the various communication devices 711 to 71N, 721 to 72N can be inquired to obtain the detection result thereof. The remaining battery power amount level and the received signal level for each of the various communication devices 711 to 71N, 721 to 72N are periodically stored into the database 412 via the processor 404. In such a periodic communication, unconnectable communication devices are ignored.

When a user transmits an emergency call, this transmission is notified from the emergency transmission acceptance unit 422 of the UI unit 410 to the processor 404. The processor 404 inquires the power management unit 414 and the mobile communication unit 406 about the remaining battery power amount level and the received signal level of the own cellular phone 402 and if the remaining battery power amount level and the received signal level are in a good state, an emergency notification is transmitted from the cellular phone 402.

In this case, if the remaining battery power amount level and the received signal level of the cellular phone 402 are in a low state, the database 412 is inquired for the remaining battery power amount levels and the received signal levels of the surrounding communication devices 711 to 71N, 721 to 72N; a communication device with the best received signal level is selected out of communication devices with sufficient remaining battery power amounts; and by instructing the BT communication unit 408 to connect with the communication device, the emergency transmission is performed through the communication device after the connection.

If the selected communication device cannot be connected for some reason, a communication device with a high received signal level is selected and the emergency transmission is performed through the communication device. If the communication device cannot be connected, a communication device with the next-highest received signal level is selected and is attempted to be connected, and if connection can be achieved, the emergency transmission can be performed through the communication device.

In this embodiment, although the cellular phone 402 is exemplified as an electronic device with the Bluetooth communication function, the electronic device with the Bluetooth communication function may be an information terminal device such as an in-vehicle device, a personal computer, etc. and a household electric device such as a television set, a watch, a refrigerator, etc.

Fifth Embodiment

Figure 21:
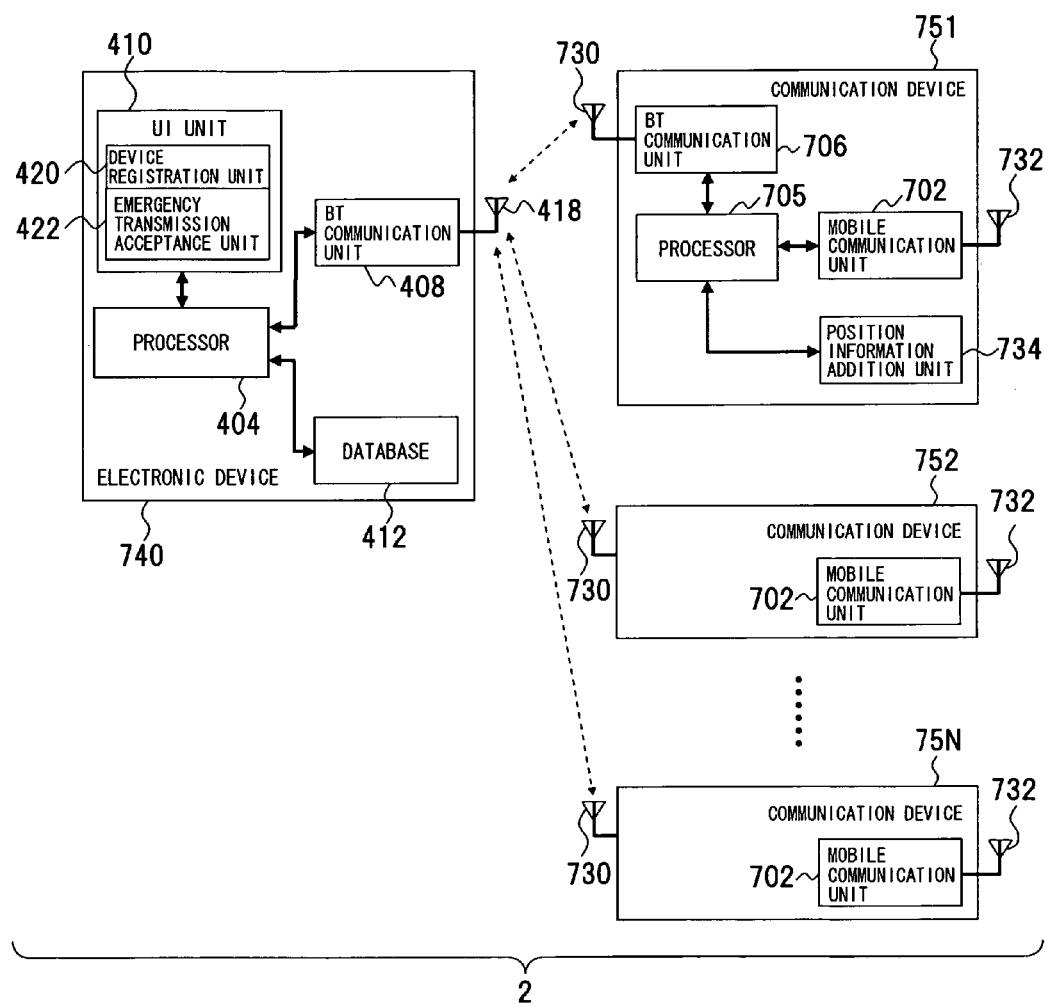
FIG. 21 is a diagram showing a dynamic priority connection system according to a fifth embodiment.
Figure 22:
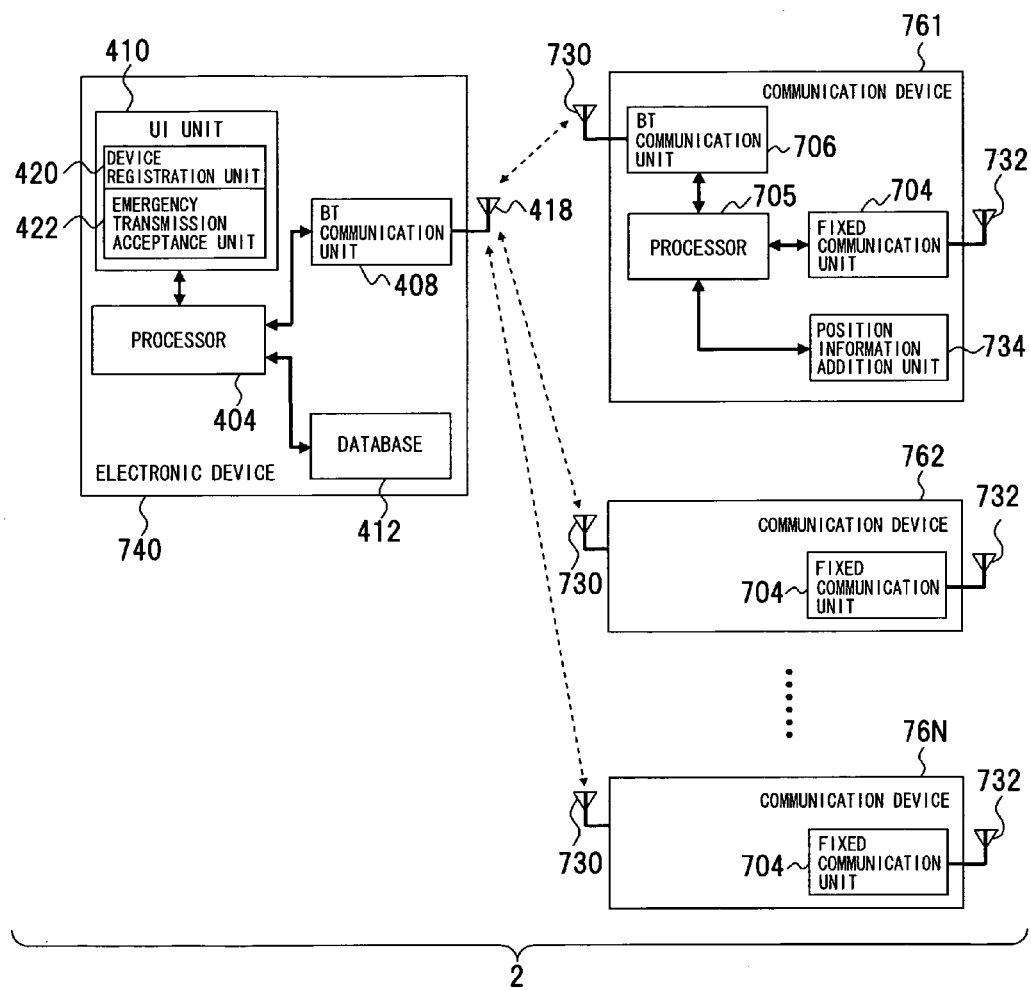
FIG. 22 is a diagram showing a dynamic priority connection system.
Figure 23:
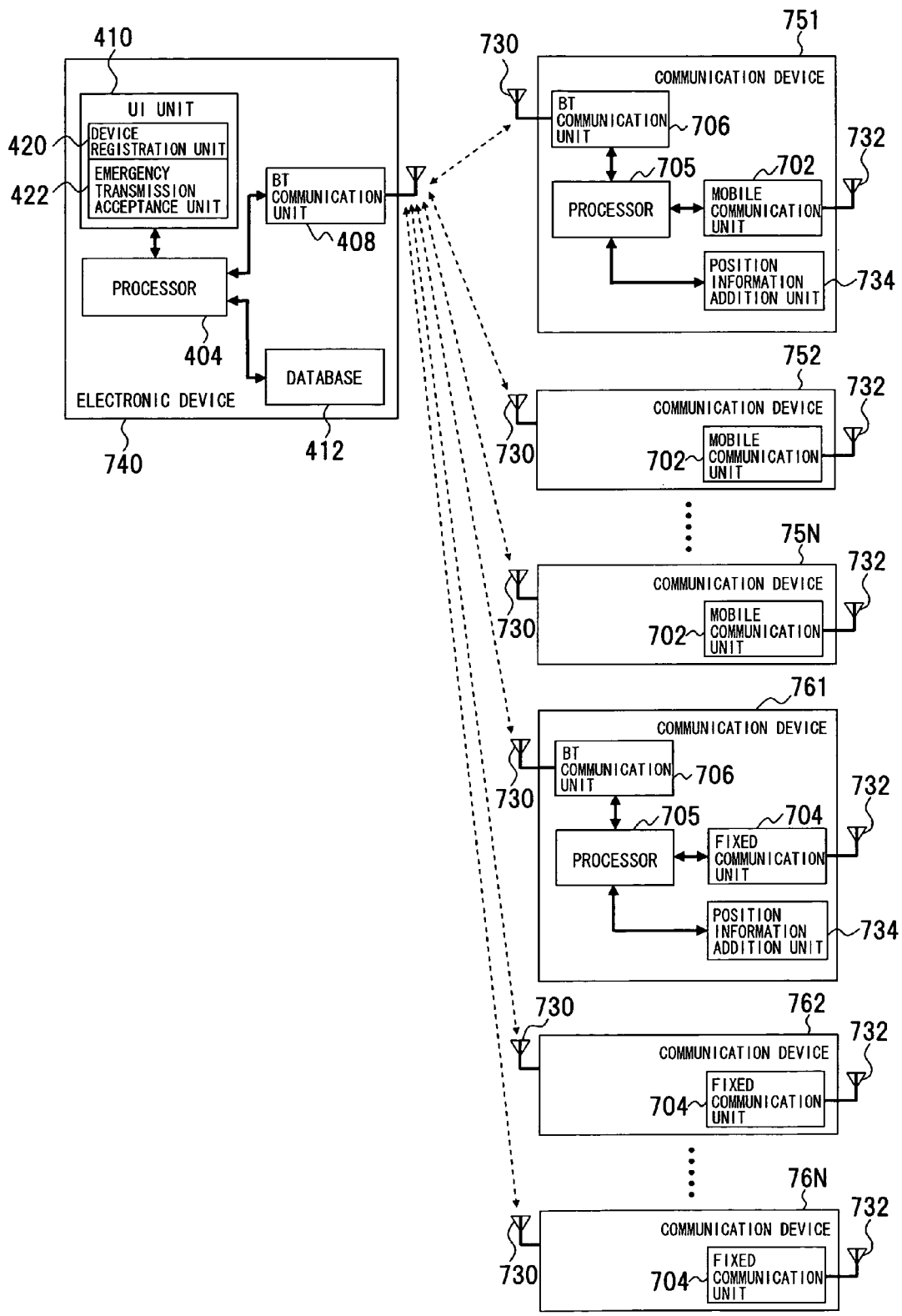
FIG. 23 is a diagram showing a dynamic priority connection system.

A fifth embodiment of the present invention is described with reference to FIG. 21, FIG. 22 and FIG. 23. FIGS. 21 to 23 are block diagrams shown the fifth embodiment of the inter-device priority connection apparatus; FIG. 21 is a block diagram showing the case of using a communication device comprising a mobile communication unit; FIG. 22 is a block diagram showing the case of using a communication device comprising a fixed communication unit; and FIG. 23 is a block diagram showing the case of using both a communication device comprising a mobile communication unit and a communication device comprising a fixed communication unit. In FIGS. 21 to 23, the same symbols are added to the portions same as the priority connection apparatus of FIGS. 18 to 20 and the descriptions thereof are omitted.

Although the power management unit 414, 708 does not installed into an electronic device 740 such as a cellular phone and communication devices 751 to 75N, 761 to 76N of this embodiment, a position information addition unit 734 is installed into the communication devices 751, 761. The position information addition unit 734 is provided with a function for measuring positions of the communication devices 751, 761 and adds the position information to the processor 705. The position information addition unit 734 is a function unit for obtaining position information of the above-described GPS, etc. Such position information is notified from the processor 705 through the BT communication unit 706 to the BT communication unit 408 of the electronic device 740 and registration is performed for whether the position information measurement function exists or not for each communication device 751 to 75N, 761 to 76N registered in the database 412.

If registration into the database 412 is performed for whether such function for enabling position measurement exists or not, a transition destination can be preferentially selected by using this information as an item for determining the transition destination of the emergency communication.

With regard to the communication devices 751, 761 with such a position information addition function, it may be configured that a specified item for determination can be specified on-demand for determining whether the communication devices are selected as the transition destinations, whether the communication devices are defined as the priority transit destinations, or whether the communication devices are defined as the non-priority transit destinations.

Sixth Embodiment

Figure 24:
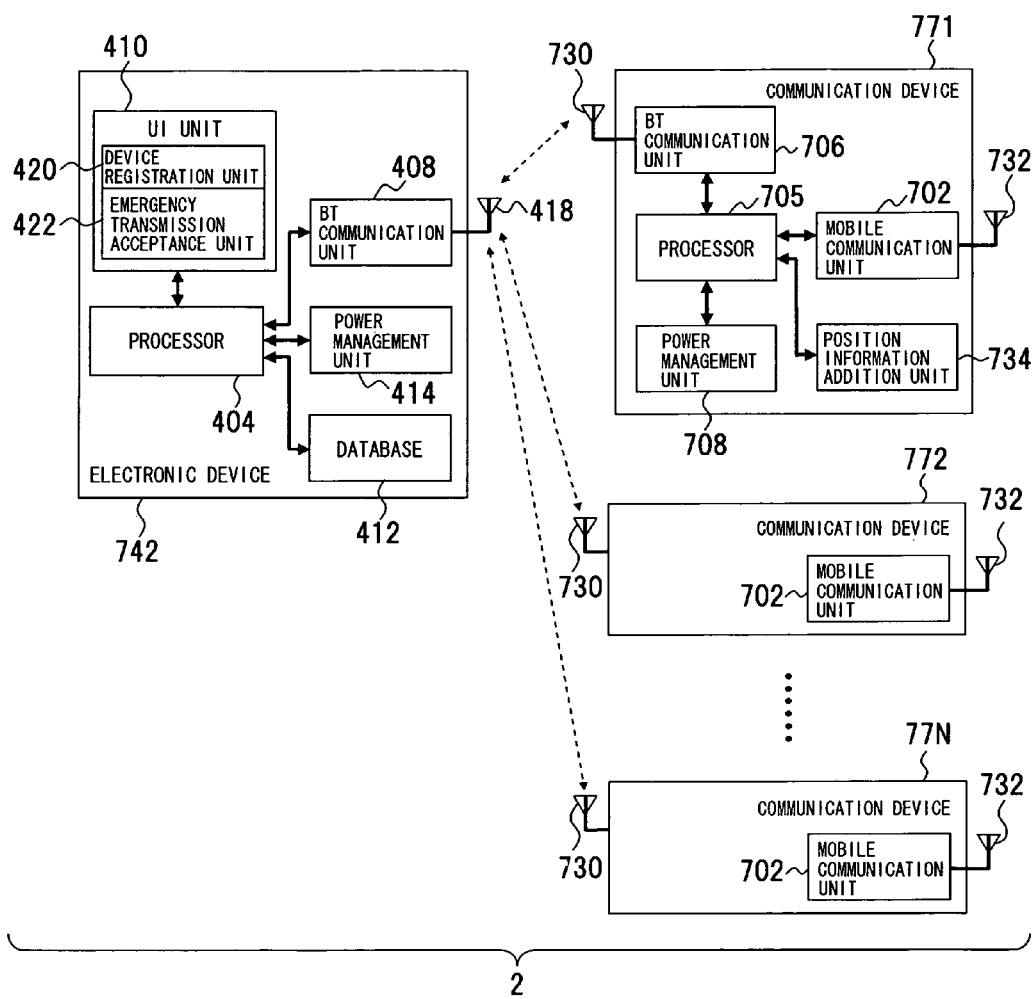
FIG. 24 is a diagram showing a dynamic priority connection system according to a sixth embodiment.
Figure 25:
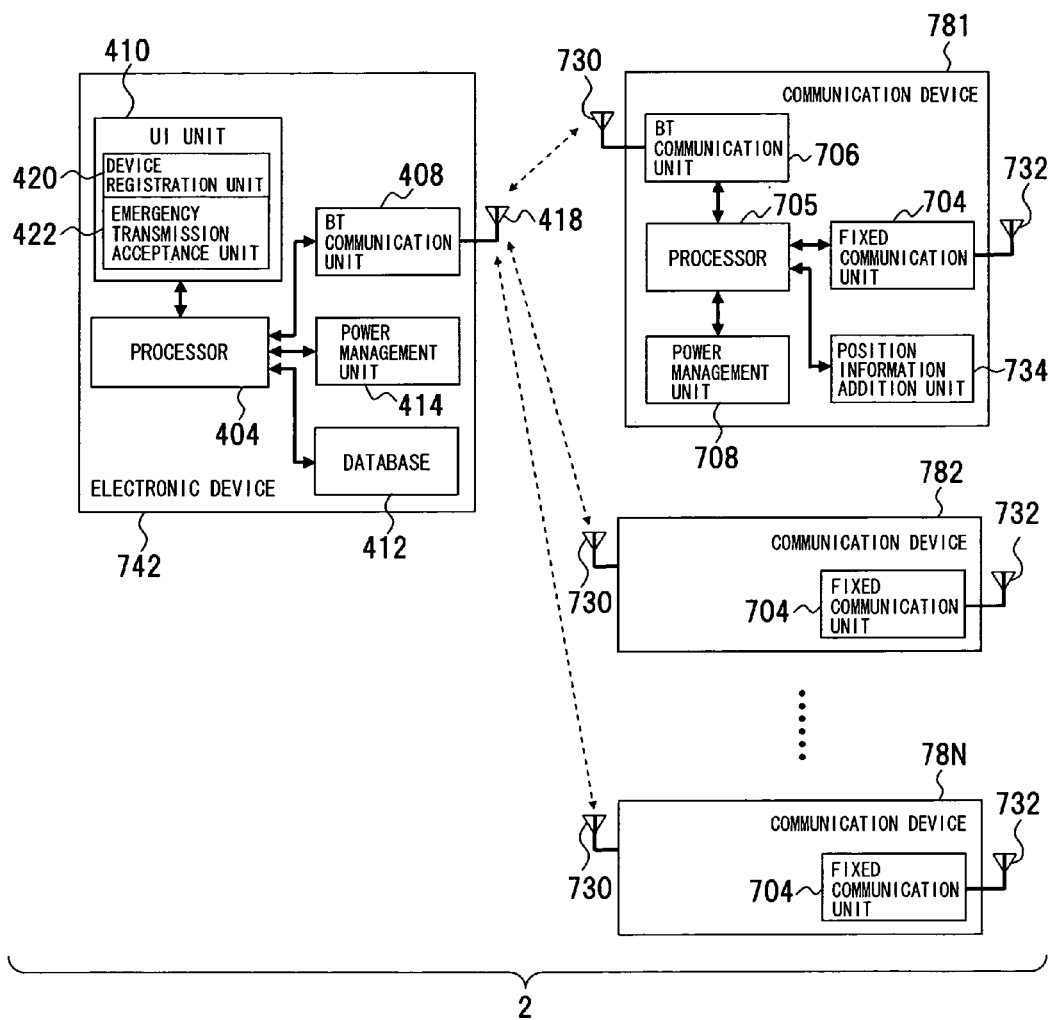
FIG. 25 is a diagram showing a dynamic priority connection system.
Figure 26:
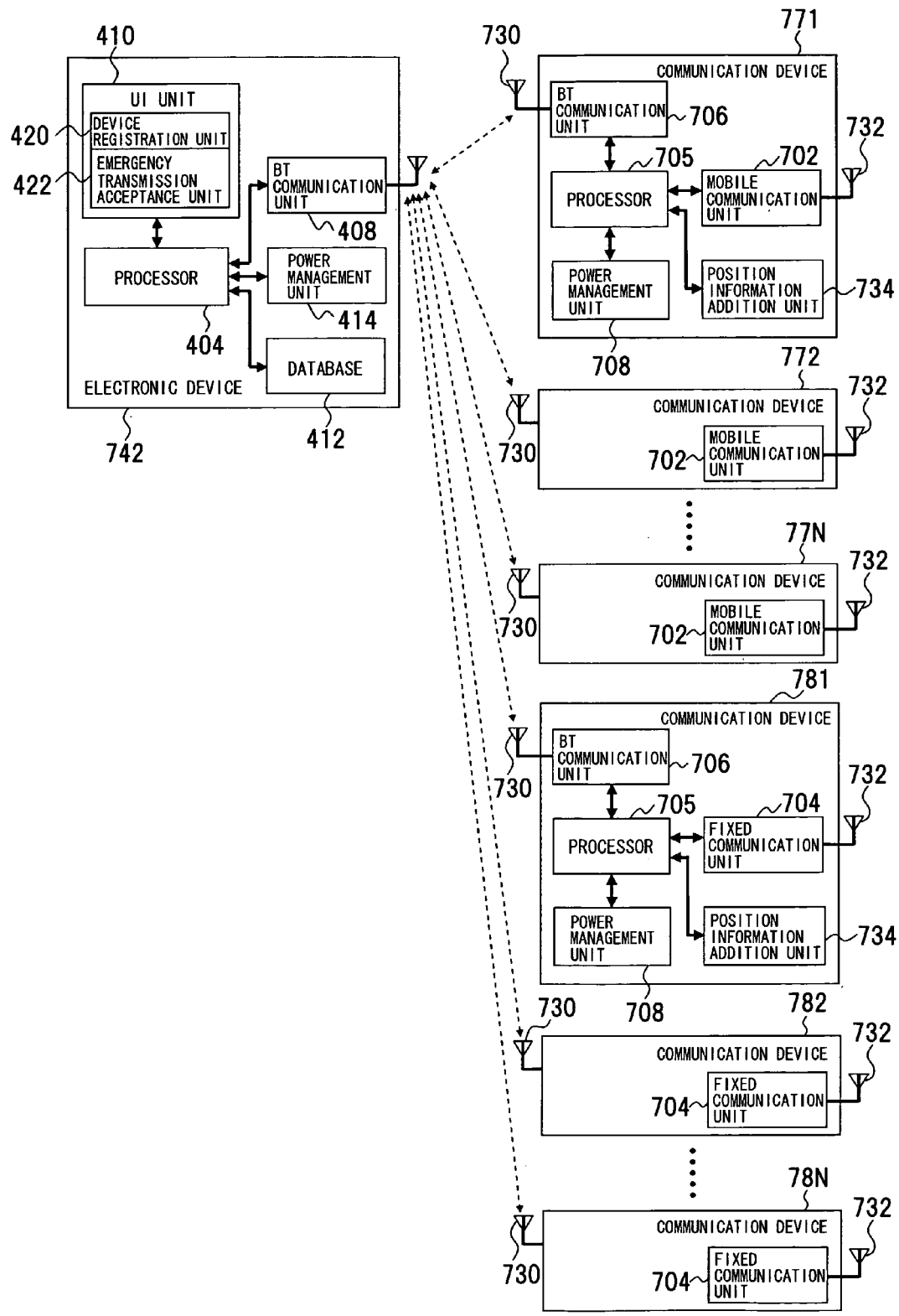
FIG. 26 is a diagram showing a dynamic priority connection system.

A sixth embodiment of the present invention is described with reference to FIG. 24, FIG. 25 and FIG. 26. FIGS. 24 to 26 are block diagrams shown the sixth embodiment of the inter-device priority connection apparatus; FIG. 24 is a block diagram showing the case of using a communication device comprising a mobile communication unit; FIG. 25 is a block diagram showing the case of using a communication device comprising a fixed communication unit; and FIG. 26 is a block diagram showing the case of using both a communication device comprising a mobile communication unit and a communication device comprising a fixed communication unit. In FIGS. 24 to 26, the same symbols are added to the portions same as the priority connection apparatus of FIGS. 18 to 20 and the descriptions thereof are omitted.

An electronic device 742 of this embodiment is provided with the power management unit 414, and the power management unit 708 and the position information addition unit 734 are installed into communication devices 771, 781. The function of the power management unit 708 is as described above, and the function of the position information addition unit 734 is as described above.

If registration into the database 412 is performed for whether such remaining battery power amount level and position measurement functions exist or not, a transition destination can be selected by using these pieces of information as items for determining the transition destination.

While inventive matters extracted from the above-mentioned embodiments are wide-ranging and shown in the SUMMARY or CLAIMS, further inventive matters are enumerated as follows.

(1) An electronic device with a short-range wireless communication function, comprising: a communication unit communicating with one or more communication devices with a short-range wireless communication function using short-range wireless communication signals; a registration unit registering the one or more communication devices as devices which can be transited at the time of emergency transmission, the registration unit communicating with the one or more communication devices to register any one or some of a remaining battery power amount from the communication device, communication status, a received signal level from a base station, and a received signal level of the short-range wireless communication signal for each of the communication devices; and a control unit connecting with a communication device having a sufficient remaining battery power amount, not in communication status, having a high received signal level from a base station and having a high received signal level of the short-range wireless communication signal to perform emergency transmission via the communication device, at the time of emergency transmission.

In such a configuration, the electronic device includes various devices with a communication function, such as a cellular phone. In this aspect of the present invention, one or more communication devices capable of communicating with the electronic device using the short-range wireless communication function are registered into the registration unit as the communication devices which can be transited at the time of the emergency transmission. It is configured that monitoring is performed for the battery power amount, the communication statuses, the received signal level from the base station or the received signal levels of the short-range wireless communication signal of the registered devices before the emergency transmission and that the emergency transmission is performed by connecting to the communication device having the high received signal level and by transiting the communication device at the time of the emergency transmission. In such a configuration, credibility can be enhanced for the emergency transmission and communication thereof.

(2) The electronic device, wherein the communication device includes a device having a fixed communication function and wherein registration into the registration unit is performed for whether a fixed communication function exists or not for each of the communication devices.

(3) The electronic device, wherein the communication device includes a device having a position measurement function and wherein the control unit uses whether the position measurement function is provided or not as a determination factor for selecting an emergency transition destination.

(4) The electronic device, wherein the communication device includes a device having the remaining battery power amount, the received signal level or a position measurement function and wherein the control unit uses the remaining battery power amount, the received signal level or a position measurement function as a determination factor for selecting an emergency transition destination.

(5) The electronic device, wherein the communication device includes a device having the remaining battery power amount, the received signal level or a position measurement function, wherein the control unit uses the remaining battery power amount, the received signal level or a position measurement function to prioritize emergency transition destinations and wherein the prioritization can be arbitrarily set.

(6) The electronic device, wherein the electronic device is a cellular phone.

(7) A device connected in a short-range wireless communication to an electronic device with a function for connecting in the short-range wireless communication, comprising: a communication unit transmitting/receiving a short-range wireless signal to/from the electronic device; and a notification unit notifying notification information from the electronic device received by the communication unit. According to such a configuration, by notifying the notification information from the electronic device to the device connected to the electronic device, the information possessed by the electronic device can be known from a connection destination.

(8) The device, wherein control information of the electronic device is transmitted through the communication unit to the electronic device.

(9) A priority connection apparatus connecting an electronic device with a short-range wireless communication function and a device in wireless communication, comprising: a communication unit for the electronic device transmitting/receiving a short-range wireless signal to/from one or more devices with a short-range wireless communication function; a registration unit imparting priorities to the plurality of the devices and registering a prioritization list representative of one or more devices sorted by the priorities; and a control unit dynamically selecting one or more devices based on the prioritization list and controlling connection through the communication unit with the selected one or more devices. According to such a configuration, with the short-range wireless communication function of the above-described electronic device and the device, dynamic connection can be performed with the one or more devices registered into the prioritization list.

(10) A priority connection apparatus connecting an electronic device with a short-range wireless communication function and a device in wireless communication, comprising: a communication unit for the device transmitting/receiving a short-range wireless signal to/from the electronic device; and a notification unit notifying notification information from the electronic device received by the communication unit.

(11) A priority connection method of an electronic device with a short-range wireless communication function, comprising the operations of: communicating with one or more communication devices with a short-range wireless communication function using short-range wireless communication signals; registering the one or more communication devices as devices which can be transited at the time of emergency transmission and communicating with the one or more communication devices to register any one or some of a remaining battery power amount from the communication device, communication status, a received signal level from a base station, and a received signal level of the short-range wireless communication signal for each of the communication devices; and connecting with a communication device having a sufficient remaining battery power amount, not in communication status, having a high received signal level from a base station and having a high received signal level of the short-range wireless communication signal to perform emergency transmission via the communication device, at the time of emergency transmission.

(12) The priority connection method of an electronic device, wherein the electronic device is a cellular phone.

(13) A priority connection program of an electronic device with a short-range wireless communication function, executed by a computer, the program comprising the steps of: communicating with one or more communication devices with a short-range wireless communication function using short-range wireless communication signals; registering the one or more communication devices as devices which can be transited at the time of emergency transmission and communicating with the one or more communication devices to register any one or some of a remaining battery power amount from the communication device, communication status, a received signal level from a base station, and a received signal level of the short-range wireless communication signal for each of the communication devices; and connecting with a communication device having a sufficient remaining battery power amount, not in communication status, having a high received signal level from a base station and having a high received signal level of the short-range wireless communication signal to perform emergency transmission via the communication device, at the time of emergency transmission.

(14) The priority connection program of an electronic device, wherein the electronic device is a cellular phone.

EXAMPLE

First Example

Figure 27:
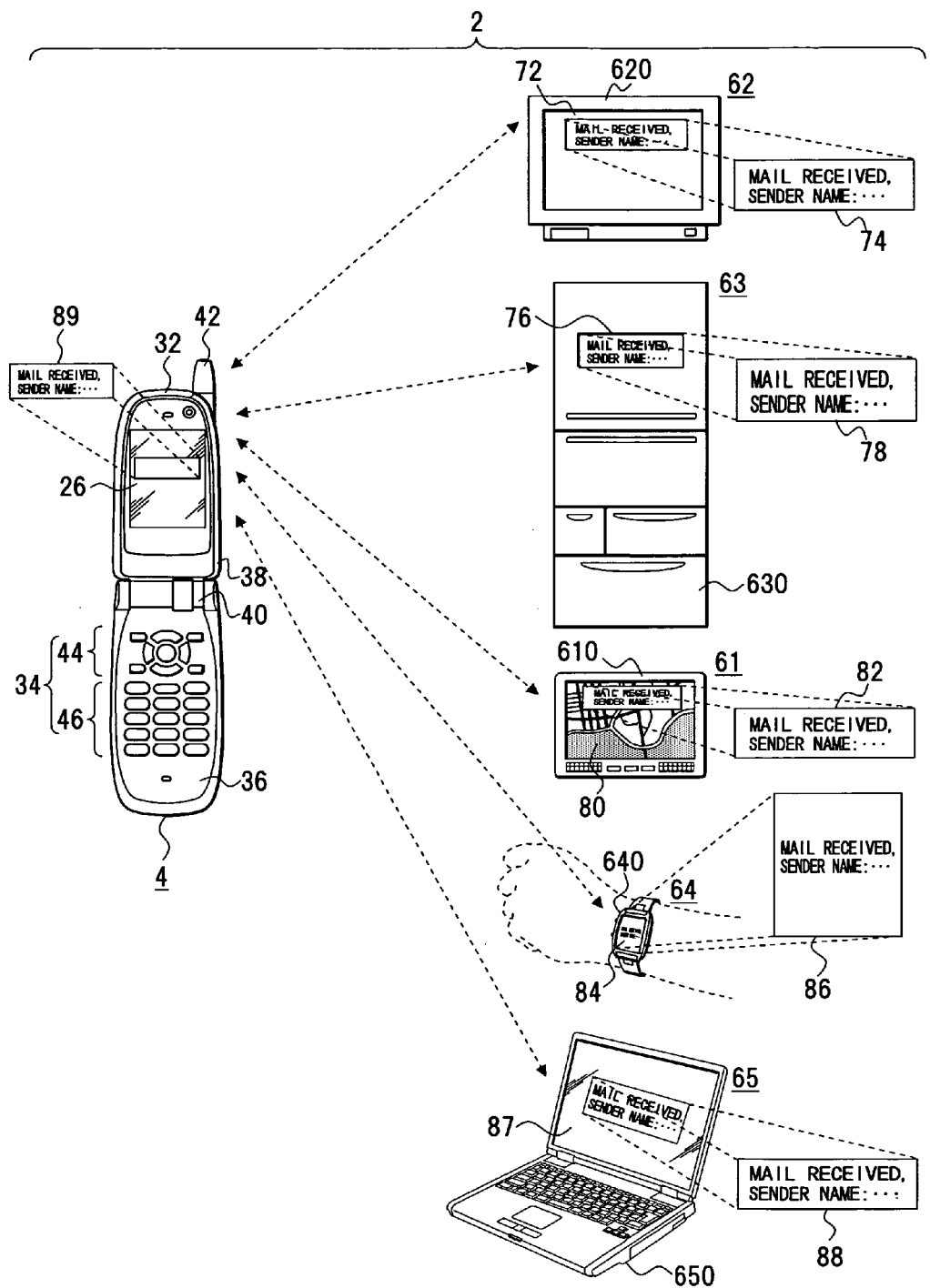
FIG. 27 is a diagram showing a connection relationship between devices, which is a first example.

A first example of the inter-device priority connection apparatus of the present invention is described with reference to FIG. 27. FIG. 27 is a diagram showing a connection relationship between the cellular phone 4 and devices 61 to 65.

In this example, the device 61 is a navigation apparatus 610 with a handsfree function which is mounted on an automobile, etc. The device 62 is a television receiver (TV) 620; the device 63 is a refrigerator 630; the device 64 is a watch 640; the device 65 is a notebook-size personal computer (PC) 650; and these devices are assumed to be connection destinations.

With regard to the case of displaying a reception notification from the cellular phone 4 on each registered device 61 to 65, each of cases (1) to (4) is described.

(1) Case that the Prioritization List is not Registered

In the case that the device addresses of the navigation apparatus 610, the TV 620 and the refrigerator 630 are registered in the device registration unit 182 of the database 18, if the prioritization list does not exist, prioritization is performed based on the received signal level in the short-range wireless communication to establish connection. In other words, the connection is achieved by the steps S21 to S24, step S27 and S28 of FIG. 8.

For example, reception information 74 is displayed on a screen 72 of the TV 620 installed in a living room; reception information 78 is displayed on a display 76 of the refrigerator 630 in a kitchen; and reception information 82 is displayed on a screen 80 of the navigation apparatus 610 in a moving automobile. The reception information 74, 78, 82 in this case is, for example, "mail received", "sender name . . . ", etc.

(2) Case that the Arbitrarily Registered Prioritization List is Registered

In this case, in the prioritization list registration unit 184 of the database 18, the TV 620 is registered as the first priority and the watch 640 and the navigation apparatus 610 are registered as the second priority.

At the time of reception, as the connection destination of the first priority, the TV 620 displays the reception information 74, and as the connection destinations of the second priority, the display 84 of the watch 640 displays reception information 86 and the navigation apparatus 610 displays the reception information 82. In other words, the reception information 74 is displayed on the TV 620 in a living room or kitchen; the reception information 82 is displayed on the display unit 80 of the navigation apparatus 610 in a moving automobile; and the reception information 86 is displayed on the watch 640 outdoor.

(3) Case that the Prioritization List for Each Position is Registered

In this case, in the prioritization list registration unit 184 of the database 18, the notebook PC 650 and the watch 640 are registered as the first priority for the home and the watch 640 and the notebook PC 650 are registered as the first priority and the second priority, respectively, for a place other than the home.

By referring to such registration information of the prioritization list for each position, reception information 88 is displayed on the display unit 87 of the notebook PC 650 at home and the reception information 86 is displayed on the watch 640 at a place other than the home.

(4) Case that the Prioritization List for Each Time Period is Registered

In this case, in the prioritization list registration unit 184 of the database 18, the watch 640 and the notebook PC 650 are registered as the first priority and the second priority, respectively, for a time period of 7:00 to 24:00 and no registration is performed for a time period of 24:00 to 7:00.

By referring to such registration information of the prioritization list for each time period, the reception information 86 and the reception information 88 are displayed on the watch 64 and the notebook PC 650, respectively, from 7:00 to 24:00, and the reception information 89 is only displayed on the display unit 26 of the cellular phone 4 from 24:00 to 7:00.

Second Example

Figure 28:
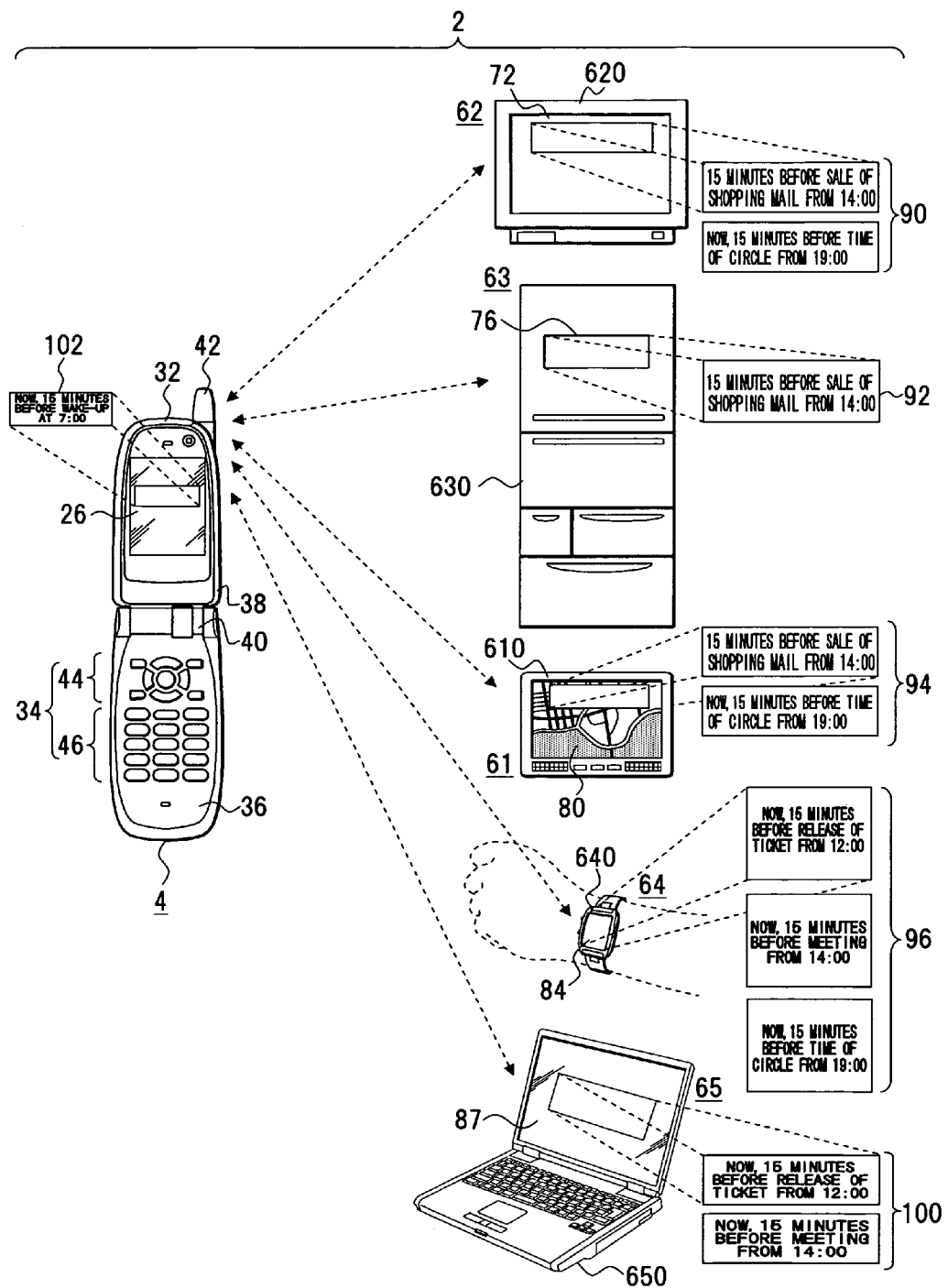
FIG. 28 is a diagram showing a connection relationship between devices, which is a second example.

A second example of the inter-device priority connection apparatus of the present invention is described with reference to FIG. 28. FIG. 28 is a diagram showing a connection relationship between the cellular phone 4 and devices 61 to 65. In FIG. 27, the same symbols are added to the portions same as FIG. 27.

With regard to the case of displaying notice information representing a schedule notice from the cellular phone 4 on each registered device 61 to 65, each of cases (5) to (8) is described.

(5) Case that the Prioritization List is not Registered

In the case that the device addresses of the navigation apparatus 610, the TV 620 and the refrigerator 630 are registered in the device registration unit 182 of the database 18, if the prioritization list does not exist, prioritization is performed based on the received signal level in the short-range wireless communication to establish connection. In other words, the connection is achieved by the steps S21 to S24, step S27 and S28 of FIG. 8.

For example, notice information 90 is displayed on the screen 72 of the TV 620 installed in a living room; notice information 92 is displayed on the display 76 of the refrigerator 630 in a kitchen; and notice information 94 is displayed on the screen 80 of the navigation apparatus 610 in a moving automobile. The notice information 90, 92, 94 is, for example, "15 minutes before sale of shopping mall from 14:00", etc.

(6) Case that the Arbitrarily Registered Prioritization List is Registered

In this case, in the prioritization list registration unit 184 of the database 18, the TV 620 is registered as the first priority and the watch 640 and the navigation apparatus 610 are registered as the second priority.

If a schedule notice is displayed, as the connection destination of the first priority, the TV 620 displays the notice information 90, and as the connection destinations of the second priority, the watch 640 displays notice information 96 and the navigation apparatus 610 displays the notice information 94. In other words, the notice information 90 is displayed on the TV 620 in a living room or kitchen; the notice information 94 is displayed on the navigation apparatus 610 in a moving automobile; and the reception information 96 is displayed on the watch 640 outdoor. The notice information 90, 94, 96 in this case is, for example, "now, 15 minutes before time of circle from 19:00", etc.

(7) Case that the Prioritization List for Each Position is Registered

In this case, in the prioritization list registration unit 184 of the database 18, the notebook PC 650 and the watch 640 are registered as the first priority for the home and the watch 640 and the notebook PC 650 are registered as the first priority and the second priority, respectively; for a place other than the home.

By referring to such registration information of the prioritization list for each position, notice information 100 is displayed on the notebook PC 650 at home and the notice information 96 is displayed on the watch 640 at a place other than the home. In this case, the notice information 96, 100 is not displayed on the watch 640 and the notebook PC 650 because of the received signal level. The notice information 96, 100 in this case is, for example, "now, 15 minutes before release of ticket from 12:00", etc.

(8) Case that the Prioritization List for Each Time Period is Registered

In this case, in the prioritization list registration unit 184 of the database 18, the watch 640 and the notebook PC 650 are registered as the first priority and the second priority, respectively, for a time period of 7:00 to 24:00 and no registration is performed for a time period of 24:00 to 7:00.

By referring to such registration information of the prioritization list for each time period, the notice information 96 and 100 is displayed on the watch 64 and the notebook PC 650, respectively, from 7:00 to 24:00, and the notice information 102 is only displayed on the cellular phone 4 from 24:00 to 7:00. The notice information 96, 100 in this case is, for example, "now, 15 minutes before meeting from 14:00", etc. The notice information 102 for the cellular phone 4 is, for example, "now, 15 minutes before wake-up at 7:00", etc.

Third Example

Figure 29:
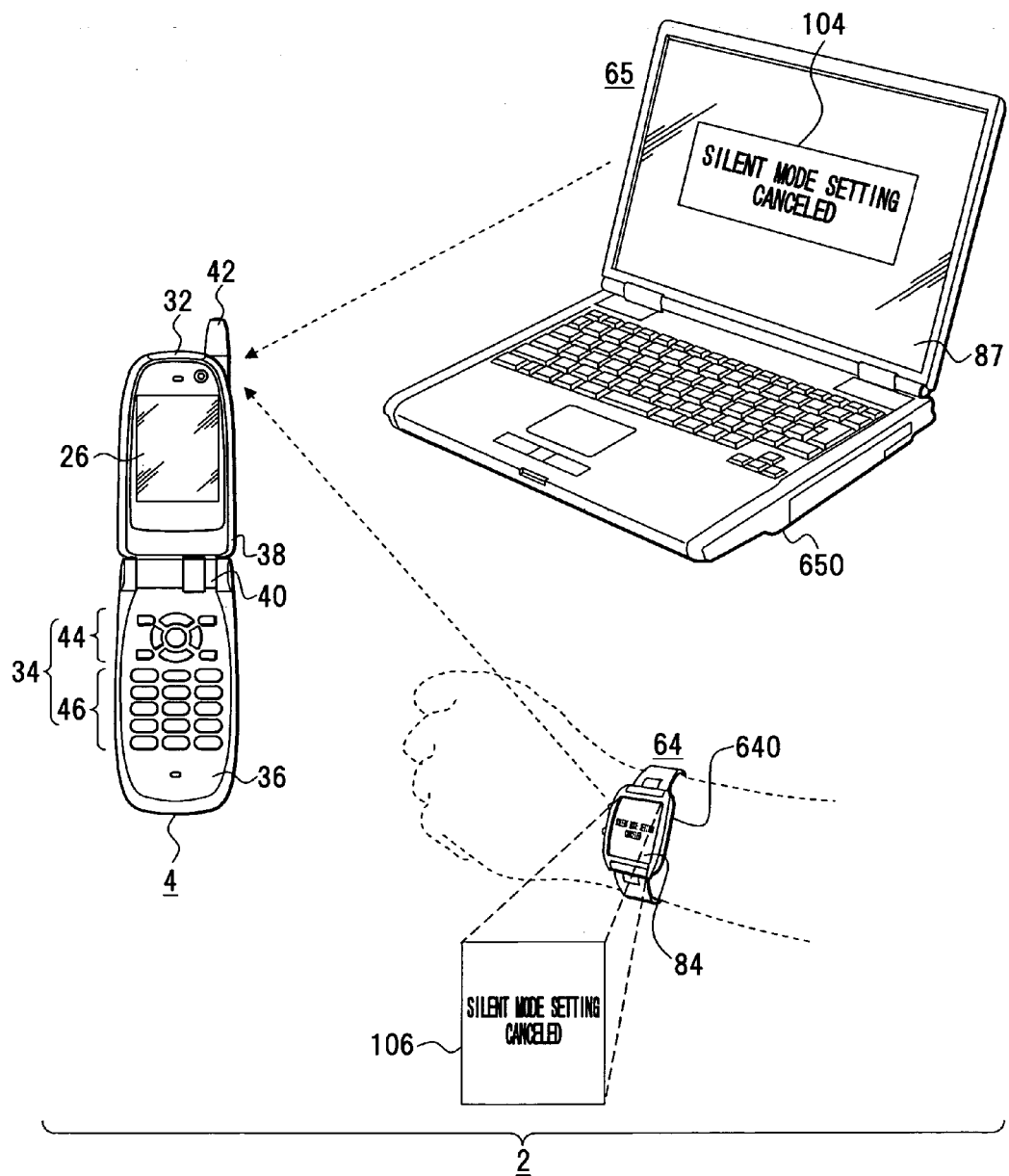
FIG. 29 is a diagram showing a connection relationship between devices, which is a third example.

A third example of the inter-device priority connection apparatus of the present invention is described with reference to FIG. 29. FIG. 29 is a diagram showing a connection relationship between the cellular phone 4 and devices 64, 65. In FIG. 29, the same symbols are added to the portions same as FIG. 27.

This example is the case of performing control, such as changing the set mode of the cellular phone 4, from the connected devices 64, 65.

In this case, the prioritization list for each position is registered in the prioritization list registration unit 184 of the database 18. With regard to dynamic automatic connection in this case, the notebook PC 650 and the watch 640 are registered as the first priority for an office and the watch 640 and the notebook PC 650 are registered as the first priority and the second priority, respectively, for a place other than the office.

With such priority connection, in the office, for example, a silent mode of the cellular phone 4 can be set or cancelled from the notebook PC 650 in the office and for example, a silent mode of the cellular phone 4 can be set or cancelled from the watch 640 in a place other than the office. On images 104, 106, "silent mode setting canceled" is displayed as a detail of control.

Fourth Example

Figure 30:
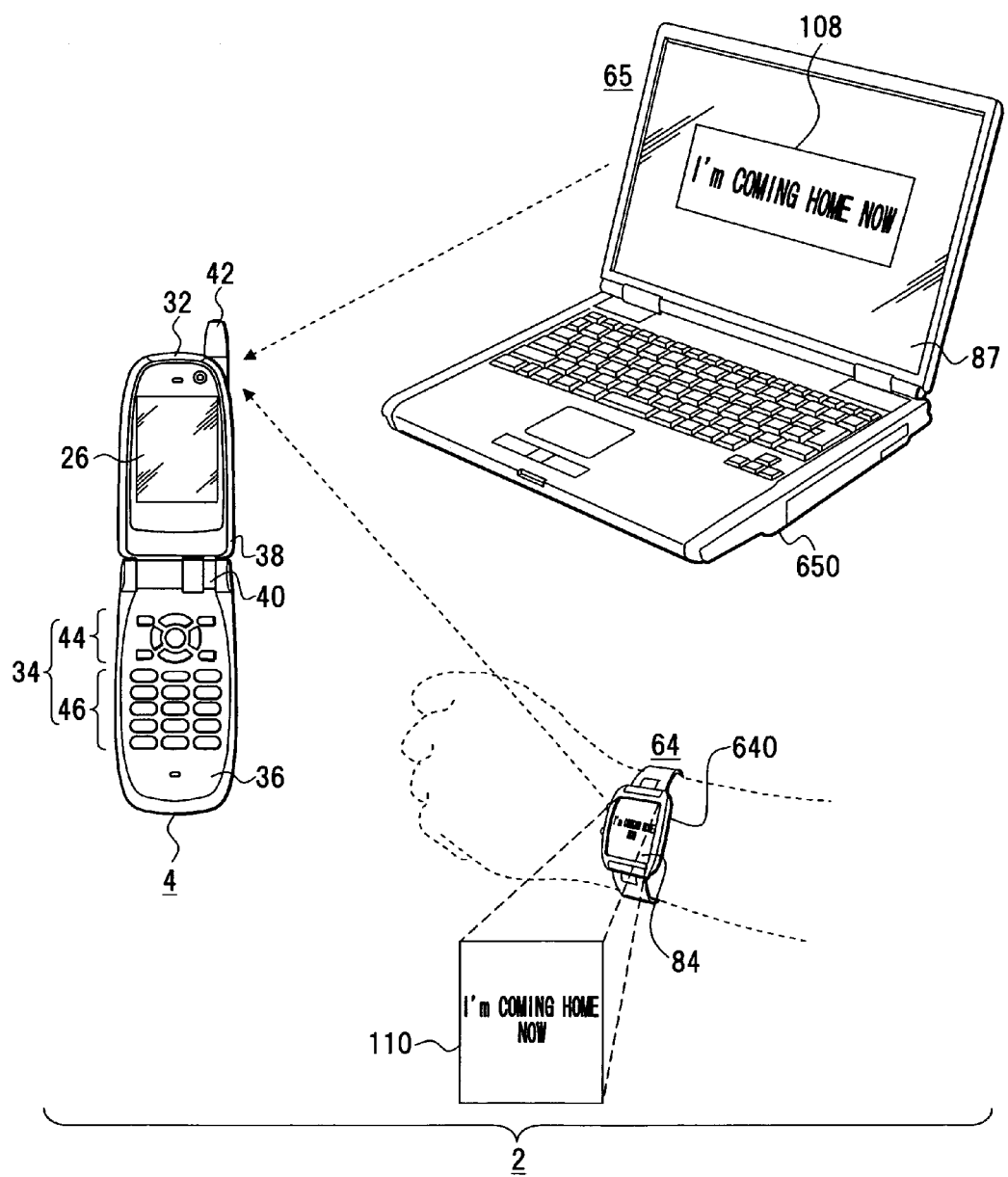
FIG. 30 is a diagram showing a connection relationship between devices, which is a fourth example.

A fourth example of the inter-device priority connection apparatus of the present invention is described with reference to FIG. 30. FIG. 30 is a diagram showing a connection relationship between the cellular phone 4 and devices 64, 65. In FIG. 30, the same symbols are added to the portions same as FIG. 27.

This example is the case of transmitting a fixed-form text mail from the device 64, 65 to the cellular phone 4.

In this case, the prioritization list for each position is registered in the prioritization list registration unit 184 of the database 18. With regard to dynamic automatic connection in this case, for example, the notebook PC 650 and the watch 640 are registered as the first priority for an office and the watch 640 and the notebook PC 650 are registered as the first priority and the second priority, respectively, for a place other than the office.

With such priority connection, in the office, a fixed-form text mail is transmitted from the notebook PC 650 to the cellular phone 4 in the office and a fixed-form text mail is transmitted from the watch 640 to the cellular phone 4 in a place other than the office. In this case, on images 108, 110, "I'm coming home now" is displayed as a fixed-form text of the fixed-form text mail.

Fifth Example

Figure 31:
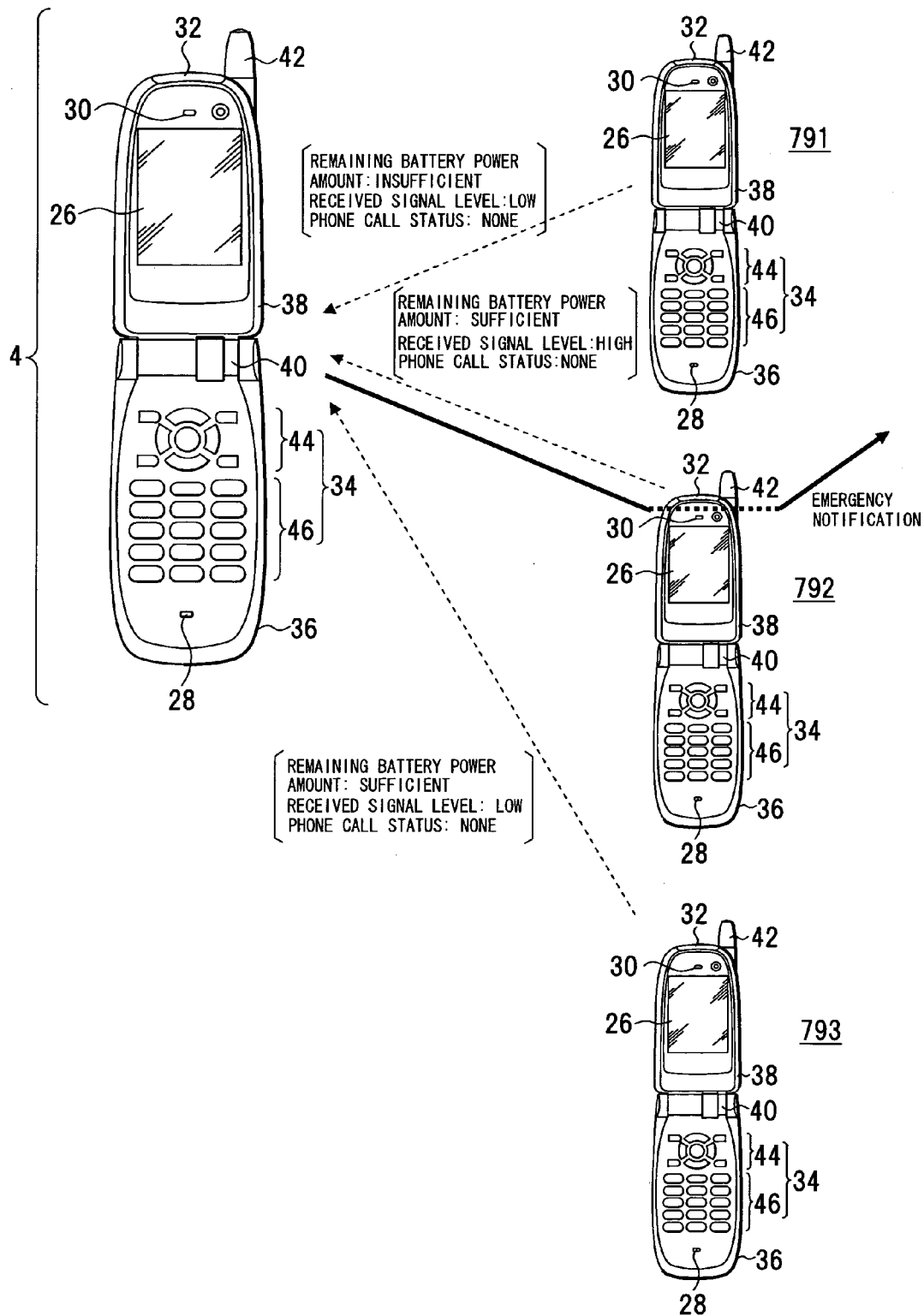
FIG. 31 is a diagram showing a connection relationship between devices, which is a fifth example.

A fifth example of the inter-device priority connection apparatus of the present invention is described with reference to FIG. 31. FIG. 31 is a diagram showing a connection relationship between the cellular phone 4 and, for example, cellular phones 791, 792, 793 which are device to be connected. In FIG. 31, the same symbols are added to the portions same as FIG. 27.

This example is the case of transmitting a phone call from the cellular phone 4 to the cellular phones 791, 792, 793.

This is the case that the cellular phones 791, 792, 793 are registered in the device registration unit 182 of the database 18; the cellular phone 4 periodically connects with the cellular phones 791, 792, 793; and with this connection, notification is performed for the received signal levels from the base station of the cellular phones 791, 792, 793, the remaining battery power amounts of the cellular phones 791, 792, 793 and the phone call statuses.

In the case of transmitting an emergency notification is transmitted from the cellular phone 4, if the cellular phone 4 does not have a sufficient received signal level from the base station or does not have the remaining battery power amount necessary for communicating with the base station, any one of the cellular phones 791, 792, 793 not in calling status, having the remaining battery power amount and having a high received signal level from the base station is selected and connected with the cellular phone 4 in the short-range wireless communication to transmit the emergency notification.

In this case, with regard to these cellular phones 791, 792, 793, for example, assuming that: in the cellular phone 791, the remaining battery power amount=insufficient, the received signal level=low and the phone call status=none; in the cellular phone 792, the remaining battery power amount=sufficient, the received signal level=high and the phone call status=none; and in the cellular phone 793, the remaining battery power amount=sufficient, the received signal level=low and the phone call status=none, the cellular phone 792 is selected. The emergency notification from the cellular phone 4 is transmitted via the cellular phone 792.

Sixth Example

Figure 32:
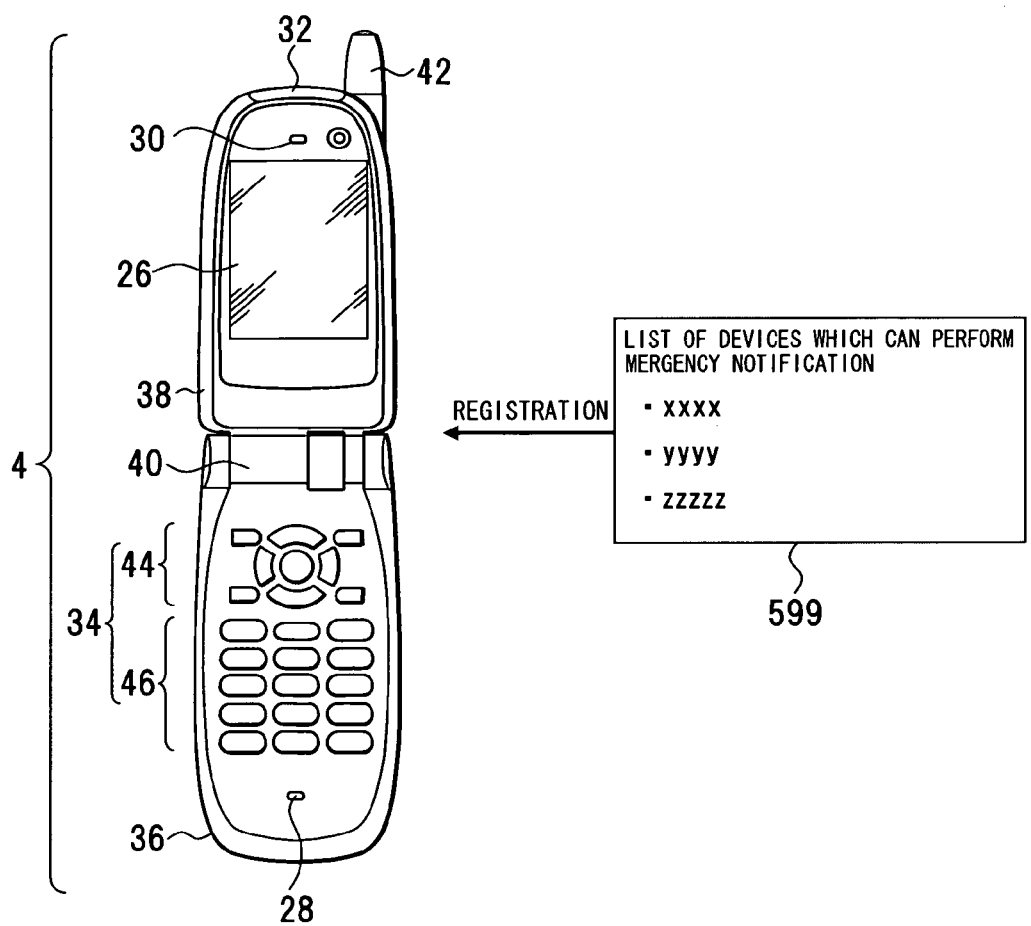
FIG. 32 is a diagram showing preliminary registration of a transition destination device, which is a sixth example.
Figure 33:
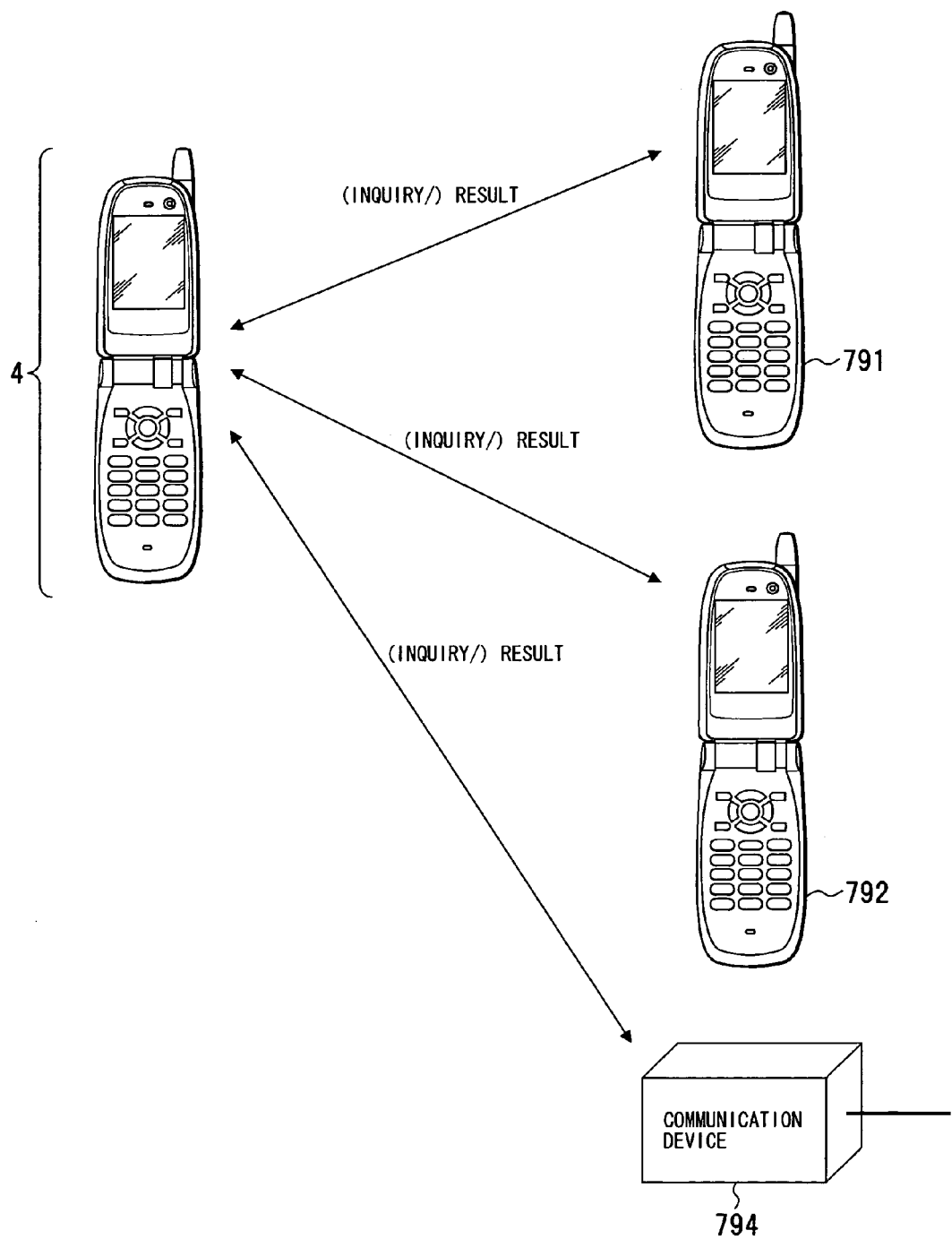
FIG. 33 is a diagram showing a communication connection relationship between devices.

A sixth example of the inter-device priority connection apparatus of the present invention is described with reference to FIG. 32 and FIG. 33. FIG. 32 is a diagram showing a preliminary registration of transition destination devices into the cellular phone 4 and FIG. 33 is a diagram showing the short-range communication with the devices preliminarily registered into the cellular phone 4. In FIG. 32 and FIG. 33, the same symbols are added to the portions same as FIG. 31.

(1) Preliminary Registration of Communication Devices

In the cellular phone 4, as the preliminary registration, registration is performed for the transition destination devices for an emergency notification which can perform the short-range wireless communication. In other words, on the assumption that the cellular phone 4 is in a state improper for the emergency notification, for example, that the received signal level is low or that the remaining battery level is low, devices being able to perform the short-range wireless communication with the cellular phone 4 is registered as the transition destination devices of the emergency notification. In FIG. 32, 599 shows a list of the detail of the registration. In this case, the device addresses of the cellular phones, etc. located in the vicinity of the cellular phone 4 are registered as the transition destination devices. By selecting the addresses, the short-range wireless communication is established and the devices can be used as the transition destinations of the emergency notification.

By permitting transmission of the emergency notification only to such registered devices, devices not registered are not used as the transition destination of the emergency notification and the credibility of the emergency notification is ensured.

(2) Check for Communication at Normal Times

In the case of registering various communication devices into the cellular phone 4, it is periodically checked using the short-range wireless communication whether communication devices matching with the registered addresses are located around or not. With this short-range wireless communication, as shown in FIG. 33, for example, if cellular phones 791, 792 or another communication device 794 exist as the communication devices matching with the registered addresses, the short-range wireless communication is used for inquiring the remaining battery power amount level, the received signal level, the presence of the position information addition function at the time of the emergency transmission, etc., as the information relevant to the selection items for the transition destinations of the emergency notification. If the information is changed in the cellular phones 791, 792 or another communication device 794, the information is notified, and the change is registered for each address of the registered communication devices and is referenced when selecting a communication device.

(3) Emergency Notification

If an emergency notification is needed for an incident, accident, disaster, distress, etc., an emergency transmission operation from the cellular phone 4 triggers a communication device to be selected by referring to a state optimal for the emergency notification among the communication devices for which the information is stored, for example, presence of the fixed communication function, a high received signal level, a high remaining battery power amount level, possibility of position measurement and position notification, etc., and the emergency notification may be performed through the selected communication device.

If the emergency notification is discontinued during the communication, it may be configured that the selection is performed again for the registered communication devices and that the same or different selected communication device is automatically connected for retransmission.

By the way, for the automatic selection of the registered communication device, weighting may be performed for each index such as the received signal level, the remaining battery power amount level and the position measurement notification function which are indices for determination, and when this weighting is configured to be set in advance, the indices for the priority setting may be configured to be customized, for example, in a particular case, such that the possibility of the position notification is given top priority if a person with impaired hearing or vision cannot notify his/her position or, in other cases, such that: the first priority is given if both the remaining battery power amount level and the received signal level are high; the second priority is given if the remaining battery power amount is low while the received signal level is high; and the third priority is given if the remaining battery power amount level is high while the received signal level is low. In this case, the customization may be configured to be performed depending on the specific circumstances, for example, such that if an emergency situation is notified, only some level of the remaining battery power amount may be sufficient and if the notification of the emergency situation is performed verbally, a certain level of the remaining battery power amount level is needed.

In this way, the present invention relates to the inter-device connection between an electronic device such as a cellular phone with a short-range wireless communication function and another device and is useful because by adding priorities to the connection destination devices and by achieving selectivity with the received signal levels in the short-range wireless communication, connection can be established with one or more devices having the highest availability and the highest received signal level to utilize the functions of each device.

Although the most preferred embodiments of the present invention have been described hereinabove, the present invention is not intended to be limited to the above description and various modifications and alterations can be naturally achieved by those skilled in the art based on the gist of the present invention as defined in the appended claims or disclosed in the specification; and it is needless to say that such modifications and alterations are encompassed within the scope of the present invention.

What is claimed is:

1. An electronic device with a short-range wireless communication function, comprising:
    a communication unit to transmit or receive a short-range wireless signal to or from devices having a short-range wireless communication function;
    a registration unit to impart priorities to the devices and to register a prioritization list listing device information of the devices sorted by the priorities; and
    a control unit to capture thereinto at least one of remaining battery power amounts of the devices, communication information representing communication statuses of the devices, received signal levels of the devices from a base station, and a signal level of the short-range wireless signal received by the communication unit, as dynamic information, to select one or more devices from the devices based on the priorities of the devices and the dynamic information, and to connect the communication unit with the selected one or more devices, wherein said one or more devices are selected out of the devices with higher priorities based on the priorities of the devices, and when said devices are selected out of some of the devices with the same priority, the selection is performed based on the dynamic information.

2. The electronic device of claim 1, wherein the dynamic information includes the signal level of the short-range wireless signal.

3. The electronic device of claim 1, wherein if the devices registered in the registration unit are cellular phones, the control unit selects one or more cellular phones from the devices based on the priorities of the cellular phones and dynamic information of the cellular phones, the dynamic information including at least one of the remaining battery power amounts, the communication statuses, and the received signal levels from the base station, and automatically connects through the communication unit with the cellular phones.

4. The electronic device of claim 1,
wherein the electronic device or the device is an information terminal device such as a cellular phone and a personal computer, a household electric device such as a television set, a moving device such as an automobile, a watch and a navigation apparatus.

5. An electronic device with a short-range wireless communication function, comprising:
a communication unit to transmit or receive a short-range wireless signal to or from devices having a short-range wireless communication function;
a registration unit to impart priorities to the devices and to register a prioritization list listing device information of the devices sorted by the priorities; and
a control unit to select one or more devices from the devices based on the priorities of the devices and dynamic information of the devices, the dynamic information being obtained from at least one of the short-range wireless signals received by the communication unit and a signal level of the short-range wireless signal received by the communication unit, and to connect the communication unit with the selected one or more devices,
wherein quantity of the selected devices is registered into the registration unit and wherein the control unit selects devices of the registered quantity.

6. An electronic device with a short-range wireless communication function, comprising:
a communication unit to transmit or receive a short-range wireless signal to or from devices having a short-range wireless communication function;
a registration unit to impart priorities to the devices and registering a prioritization list listing device information of the devices sorted by the priorities; and
a control unit to select one or more devices from the devices based on the priorities of the devices and dynamic information of the devices, the dynamic information being obtained from at least one of the short-range wireless signals received by the communication unit and a signal level of the short-range wireless signal received by the communication unit, and to connect the communication unit with the selected one or more devices,
wherein the prioritization list includes pieces of position information or time information, and the priorities are imparted for each piece of the position information or the time information, and
wherein the control unit selects said one or more devices based on the priorities adapted to the time information or position information of the electronic device, and the dynamic information.

7. A priority connection method connecting an electronic device with a short-range wireless communication function and another device, comprising:
transmitting or receiving a short-range wireless signal to or from devices having a short-range wireless communication function;
imparting priorities to the devices;
registering a prioritization list listing device information of the devices sorted by the priorities into a registration unit;
capturing at least one of remaining battery power amounts of the devices, communication information representing communication statuses of the devices, received signal levels of the devices from a base station, and a signal level of the received short-range wireless signal as dynamic information, and selecting one or more devices from the devices based on the priorities of the devices and the dynamic information; and
connecting the selected one or more devices in short-range wireless communication, wherein
said one or more devices are selected out of the devices with higher priorities based on the priorities of the devices, and when said devices are selected out of some of the devices with the same priority, the selection is performed based on the dynamic information.

8. The priority connection method of claim 7, wherein the dynamic information includes the signal level of the short-range wireless signal.

9. A priority connection method connecting an electronic device with a short-range wireless communication function and another device, comprising:
transmitting or receiving a short-range wireless signal to or from devices having a short-range wireless communication function;
imparting priorities to the devices;
registering a prioritization list listing device information of the devices sorted by the priorities;
registering quantity of devices connected;
selecting devices of the registered quantity from the devices based on the priorities of the devices and dynamic information of the devices, the dynamic information being obtained from at least one of the received short-range wireless signals and a signal level of the received short-range wireless signals; and
connecting the selected devices in short-range wireless communication.

10. A priority connection method connecting an electronic device with a short-range wireless communication function and another device, comprising:
transmitting or receiving a short-range wireless signal to or from devices having a short-range wireless communication function;
imparting priorities to the devices;
registering a prioritization list listing device information of the devices sorted by the priorities into a registration unit;
selecting one or more devices from the devices based on the priorities of the devices and dynamic information of the devices, the dynamic information being obtained from at least one of the received short-range wireless signals and a signal level of the received short-range wireless signals; and
connecting the selected one or more devices in short-range wireless communication, wherein
the prioritization list includes pieces of position information or time information, and the priorities are imparted for each piece of the position information or the time information, and
wherein said one or more devices are selected based on the priorities adapted to the time information or position information of the electronic device, and the dynamic information.

11. A priority connection program executed by a computer to connect an electronic device with a short-range wireless communication function and another device, the program comprising:
transmitting or receiving a short-range wireless signal to or from devices having a short-range wireless communication function;
imparting priorities to the devices;
registering a prioritization list listing device information of the devices sorted by the priorities into a registration unit;
capturing at least one of remaining battery power amounts of the devices, communication information representing communication statuses of the devices, received signal levels of the devices from a base station, and a signal level of the received short-range wireless signal as dynamic information, and selecting one or more devices from the devices based on the priorities of the devices and the dynamic information; and connecting the selected one or more devices in short-range wireless communication, wherein said one or more devices are selected out of the devices with higher priorities based on the priorities of the devices, and when said devices are selected out of some of the devices with the same priority, the selection is performed based on the dynamic information.

12. The priority connection program of claim 11, wherein the dynamic information includes the signal level of the short-range wireless signal.

13. A priority connection program executed by a computer to connect an electronic device with a short-range wireless communication function and another device, the program comprising:

transmitting or receiving a short-range wireless signal to or from devices having a short-range wireless communication function;

imparting priorities to the devices;

registering a prioritization list listing device information of the devices sorted by the priorities;

registering quantity of devices connected;

selecting devices of the registered quantity from the devices based on the priorities of the devices and dynamic information of the devices, the dynamic information being obtained from at least one of the received short-range wireless signals and a signal level of the received short-range wireless signals; and connecting the selected devices in short-range wireless communication.

14. A priority connection program executed by a computer to connect an electronic device with a short-range wireless communication function and another device, the program comprising:

transmitting or receiving a short-range wireless signal to or from devices having a short-range wireless communication function;

imparting priorities to the devices;

registering a prioritization list listing device information of the devices sorted by the priorities into a registration unit;

selecting one or more devices from the devices based on the priorities of the devices and dynamic information of the devices, the dynamic information being obtained from at least one of the received short-range wireless signals and a signal level of the received short-range wireless signals; and connecting the selected one or more devices in short-range wireless communication, wherein the prioritization list includes pieces of position information or time information, and the priorities are imparted for each piece of the position information or the time information, and wherein said one or more devices are selected based on the priorities adapted to the time information or position information of the electronic device, and the dynamic information.

* * * * *